United States Patent [15] 3,707,712

Deschenes et al. [45] Dec. 26, 1972

[54] CONVERTER FROM DELTA MODULATION TO PULSE CODE MODULATION

[72] Inventors: Pierre A. Deschenes, Sherbrooke, Quebec, Canada; Michel Villeret, Gisors, France

[73] Assignee: Universite de Sherbrooke, Sherbrooke, Quebec, Canada

[22] Filed: June 10, 1970

[21] Appl. No.: 44,994

[52] U.S. Cl. ................340/347 DD, 325/38 B, 332/9, 179/15 AP

[51] Int. Cl. ...H03k 11/00, H03k 13/00, H03k 13/24

[58] Field of Search ..............325/38 B; 340/347 DD; 235/92 EV; 179/15 AP; 332/9, 11

[56] References Cited

UNITED STATES PATENTS

| | | | |
|---|---|---|---|
| 3,296,612 | 1/1967 | Tomozawa | 325/38 B |
| 3,145,292 | 8/1964 | Schwaninger | 235/92 EV |

*Primary Examiner*—Daryl W. Cook
*Assistant Examiner*—Thomas J. Sloyan
*Attorney*—Raymond A. Robic

[57] ABSTRACT

A system for the conversion of a delta modulation (ΔM) signal into a pulse code modulation (PCM) signal and vice versa. The system for the conversion of a ΔM modulation signal into a PCM modulation signal comprises: register means for storing an input signal consisting of *n* binary digits generated by a ΔM modulator during a time period corresponding to a normal PCM modulation sampling period $T_i$, each binary digit representing a positive or negative ΔM modulation quantization step of a quantized signal; means for effecting the algebraic sum of the positive and negative quantization steps to obtain the increase or decrease of the quantized signal during the sampling period; means for multiplying the algebraic sum by a constant K representing the ratio of the value of a ΔM modulation quantization step over the value of a PCM modulation quantization step to obtain a binary signal representing the increase or decrease of the quantized signal in pulse code modulation quantization steps; and means for adding the binary signal obtained by the above multiplication to the binary signal obtained during the sampling period $T_{i-1}$ to obtain a binary output signal corresponding to the required pulse code modulation signal.

10 Claims, 32 Drawing Figures

INVENTORS
Pierre A. DESCHENES
Michel VILLERET

ATTORNEY

INVENTORS
Pierre A. DESCHENES
Michel VILLERET

ATTORNEY

*INVENTORS*
Pierre A. DESCHENES
Michel VILLERET
Raymond A. [signature]
*ATTORNEY*

INVENTORS
Pierre A. DESCHENES
Michel VILLERET
[signature]
ATTORNEY

INVENTORS
Pierre A. DESCHENES
Michel VILLERET

Raymond A. Robic

ATTORNEY

INVENTORS
Pierre A. DESCHENES
Michel VILLERET

ATTORNEY

INVENTORS
Pierre A. DESCHENES
Michel VILLERET

ATTORNEY

INVENTORS
Pierre A. DESCHENES
Michel VILLERET

Raymond A. Robic
ATTORNEY

INVENTORS
Pierre A. DESCHENES
Michel VILLERET
ATTORNEY

INVENTORS
Pierre A. DESCHENES
Michel VILLERET
ATTORNEY

INVENTORS
Pierre A. DESCHENES
Michel VILLERET

ATTORNEY

CONVERTER FROM DELTA MODULATION TO PULSE CODE MODULATION

This invention relates to a system permitting the use of delta modulation (ΔM) in integrated telecommunication systems and, more particularly, to a digital converter for transforming ΔM modulation signals into pulse code modulation (PCM) signals and vice versa.

As it is commonly known, both the ΔM and the PCM modulation systems perform a digital transformation of an analog signal. However, the ΔM modulation possesses two essential characteristics which distinguish such modulation from the PCM modulation. The first characteristic is that a ΔM system is a closed loop system. The second characteristic is that the information transmitted by a ΔM modulation system relates to a change of amplitude between two consecutive samples of an analog signal whereas a PCM modulation system transmits the quantized amplitude of each sample of the analog signal.

The encoder of a ΔM modulation system comprises generally a pulse generator, a modulator, an integrator and a comparator. At the input of the system, the comparator compares the instantaneous amplitude of the analog signal with the amplitude of the analog signal stored in the integrator at the time of the previous sampling and generates a positive or negative output signal depending on whether the instantaneous amplitude of the analog signal is higher or lower than the amplitude of the analog signal stored in the integrator. The output of the comparator controls the output pulses of the pulse generator which are fed to the modulator so that the modulator generates corresponding positive or negative pulses. The train of positive or negative pulses is generated in accordance with the frequency of the pulse generator which frequency is kept constant. The train of positive and negative pulses is also fed to the integrator causing the output of the integrator to rise or fall depending on the polarity of the pulses of the modulator. Two types of integration will be considered here, that is the simple integration and the double integration. In the first case, the output of the integrator consists of the sum of a series of positive or negative quantization steps depending on the positive or negative pulses of the modulator. In the second case, the output of the integrator is a series of straight line segments the slope of which is modified by each of the above pulses.

In North America, the PCM modulation system has been used for the last few years. Such system permits the transmission of twenty-four communication channels on a single telephone line, each communication channel being multiplexed with respect to time. Although a completely digital telecommunication system has been envisaged for some time due to the increasing use of the telephone lines for transmitting data (telex, facsimile, computer data), it has always proven to be more economical to build up upon the existing telephone network.

ΔM modulation is not generally used in North America. However, it would be advantageous to use ΔM modulation in telecommunication because a ΔM modulator is simple and inexpensive and therefore would permit the installation of one modulator at each subscriber premises. We would then have a completely digital system right from the subscriber and, with telex in particular, it would be possible to eliminate the hereintofore required separate voice channel since the voice could then be transmitted on the data channel. Such a digital system is not possible using PCM modulation because its cost is so high that it requires the use of one modulator for several subscribers. A second advantage is that the use of a ΔM modulator would reduce the number of subscriber lines considerably since each subscriber would be allocated a time interval in each frame grouping 24 communication channels, that is 24 subscribers could be connected to two telephone lines.

However, the insertion of a ΔM modulation system in a network where a PCM modulation system is already in use requires that the two systems be compatible so as to permit a subscriber belonging to a ΔM modulation system to communicate with another subscriber belonging to a PCM modulation system or vice-versa.

It is therefore the object of the invention to provide a converter for directly transforming a ΔM modulation signal into a PCM modulation signal and vice versa without having to transform the digital signal into an analog form as an intermediate step.

It is to be noted that in order to be present at the same time on the same network, the ΔM modulation system and the PCM modulation system must have the same transmission characteristics. As it is already known, a seven digit binary code is used in the PCM modulation system for transmitting analog signals in a coded manner. In addition, the sampling frequency of the PCM modulation system is 8 KHz. Consequently, in the ΔM modulation system, which uses a single digit binary code, a sampling frequency of 56 KHz must be used in order to be able to generate a number having seven binary digits during a normal PCM sampling period of 125 micro seconds.

The converter, in accordance with the invention, comprises:

a. register means for storing an input signal consisting of $n$ binary digits generated by a ΔM modulator during a time interval corresponding to a normal pulse code modulation sampling period $T_i$, each binary digit representing a positive or negative ΔM modulation quantization step of a quantized signal;

b. means for effecting the algebraic sum of said positive and negative quantization steps to obtain the increase or decrease of the quantized signal during said sampling period;

c. means for multiplying said algebraic sum by a constant K representing the ratio of the value of a ΔM modulation quantization step over the value of a PCM modulation quantization step to obtain a binary signal representing said increase or decrease of the quantized signal in pulse code modulation quantization steps; and d. means for adding the binary signal obtained by said multiplication to the binary signal obtained during the preceding sampling period $T_{i-1}$ to obtain a binary output signal corresponding to the required pulse code modulation signal.

The system for doing the reverse operation, that is the conversion of a PCM modulation signal into a ΔM modulation signal comprises:

a. first register means for storing an input signal consisting of $m$ binary digits and representing the value $x$ of the quantized signal at the end of a regular PCM modulation sampling period $T_i$;

b. a "digital integrator" for storing the value e of the quantized signal at the time of sampling period $T_{i-1}$;

c. a comparator connected to said register means and to said "digital integrator" for comparing the value of the quantized signal stored in said first register means with the value of the quantized signal stored in said "-digital integrator" and for generating a positive binary output signal $Z=1$ if $x > e$ and a negative binary output signal $Z=0$ if $x < e$; and d. second register means connected to said comparator for storing said output signal which is representative of the ΔM modulation signal.

The invention will be further disclosed with reference to the accompanying drawings which illustrate preferred embodiments of the invention and in which.

Figure 7:
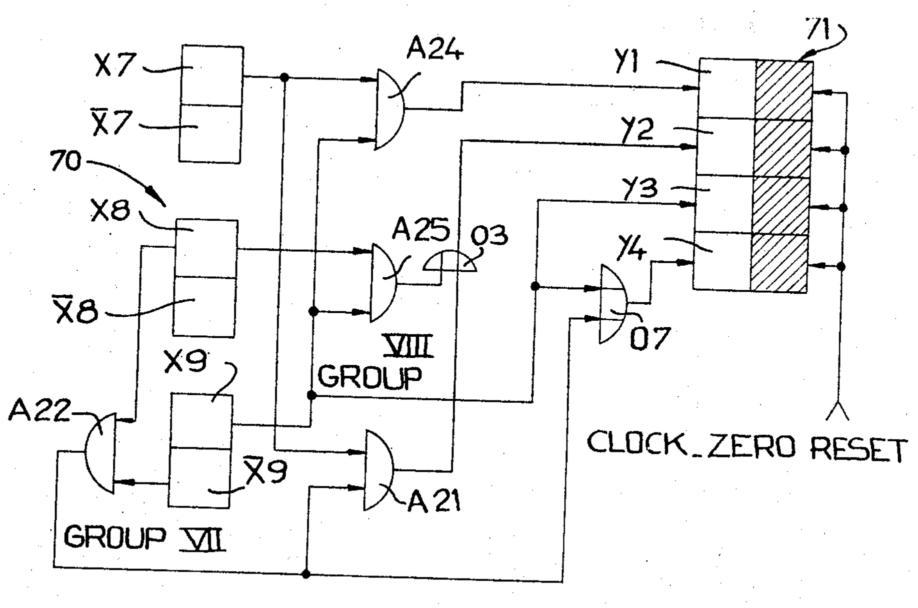
Figure 9:
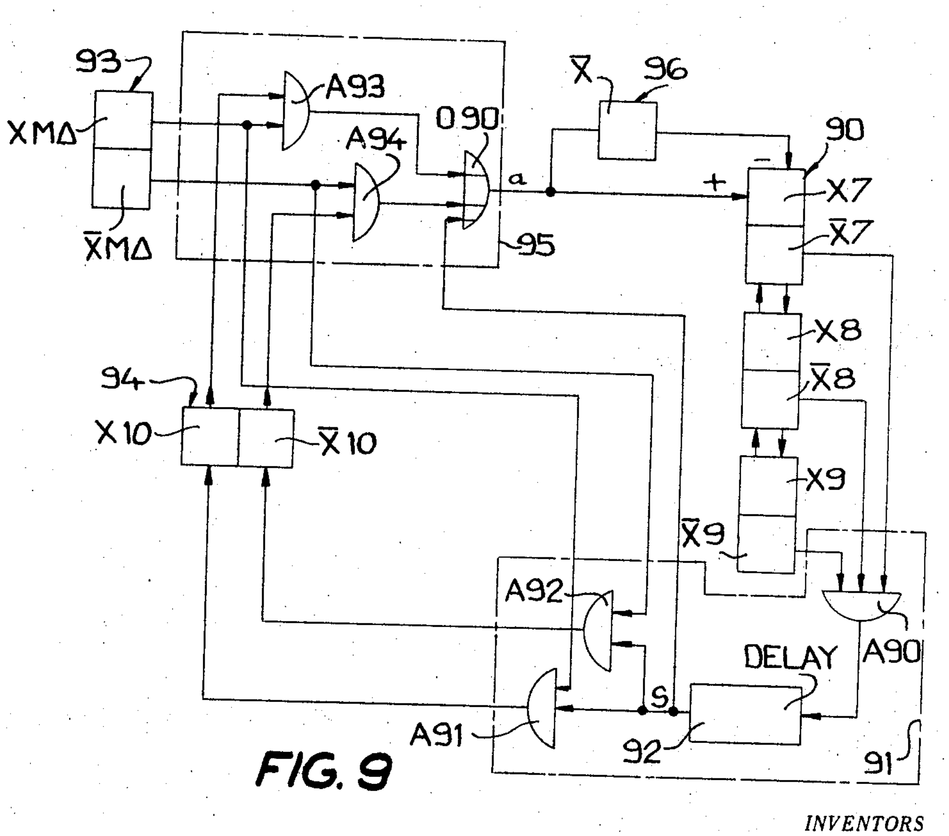
Figures 8, 11:
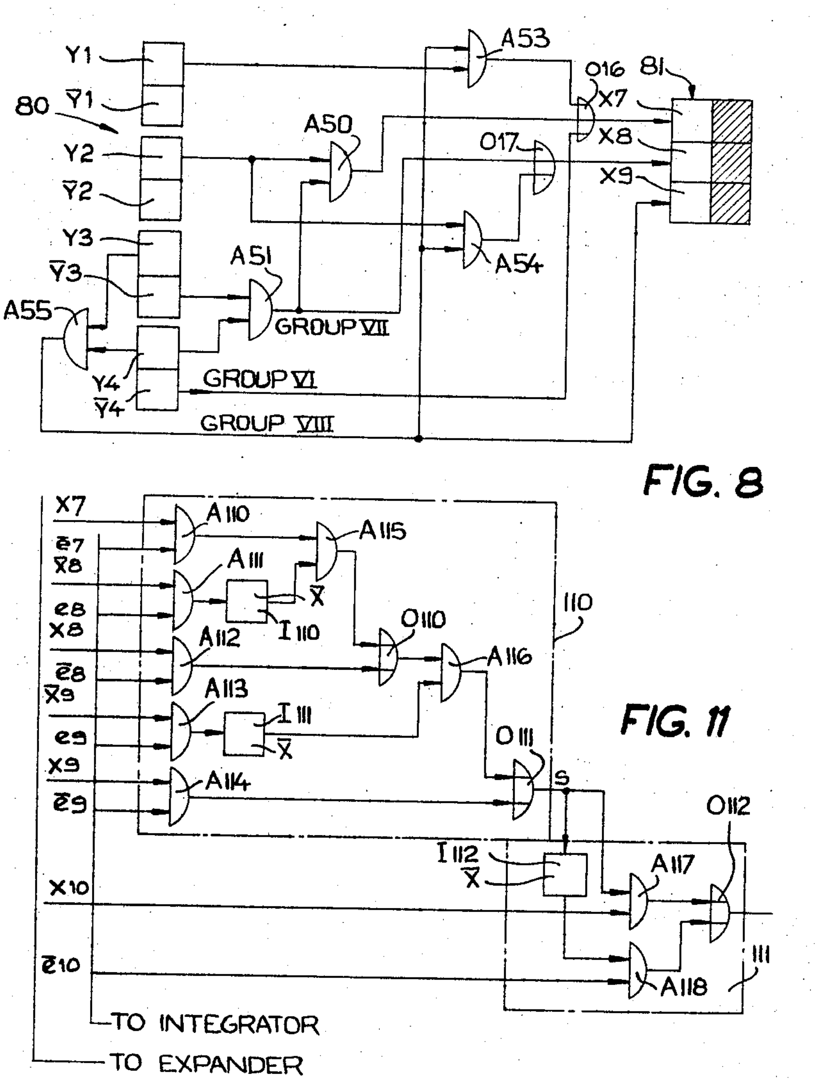
Figure 12:
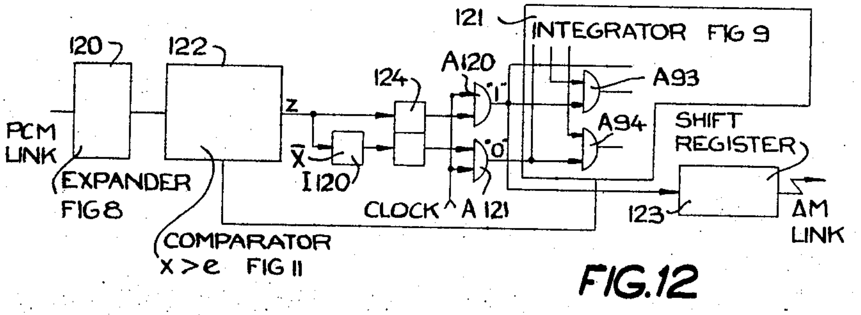
Figure 10:
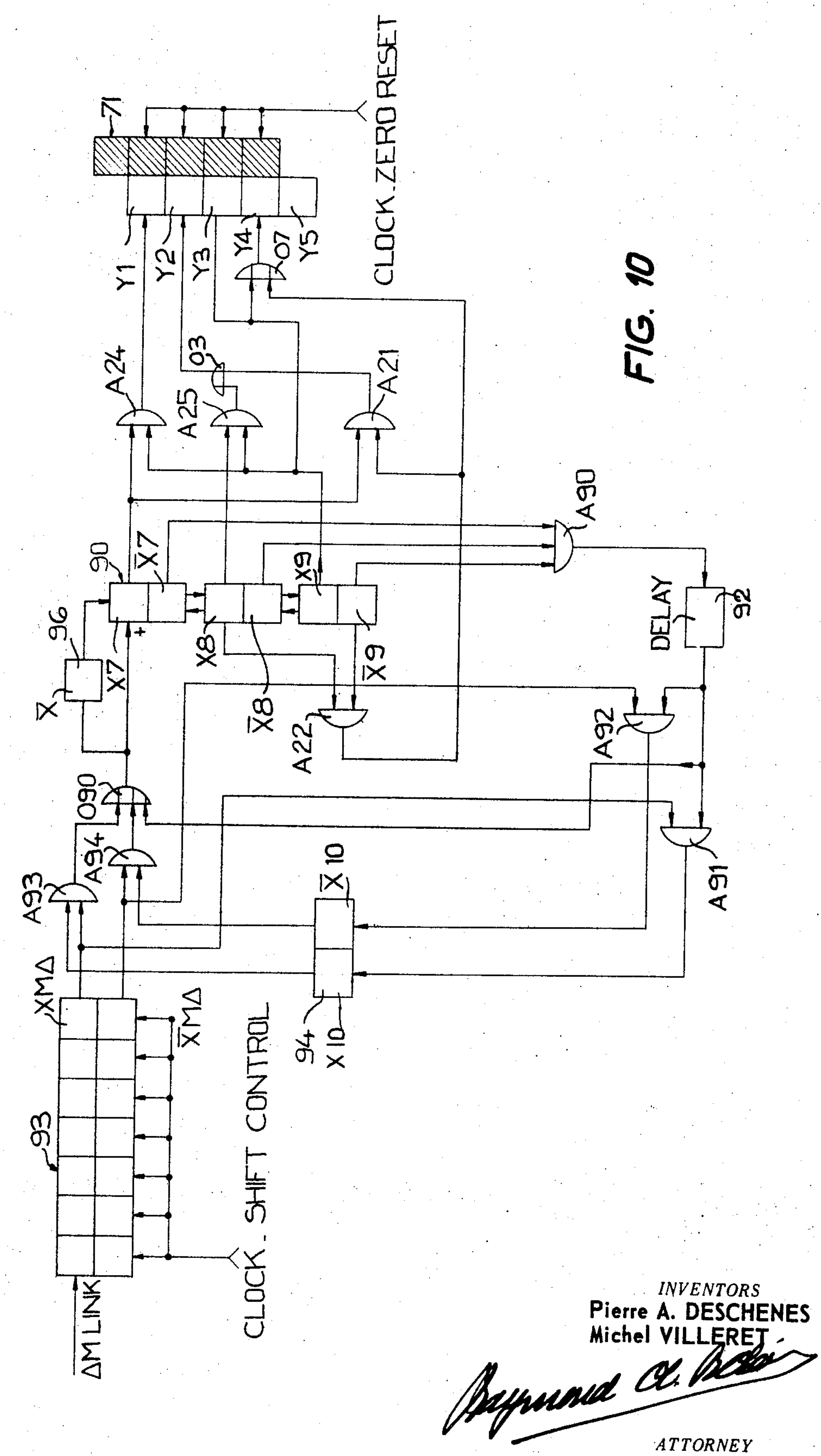
Figure 13A:
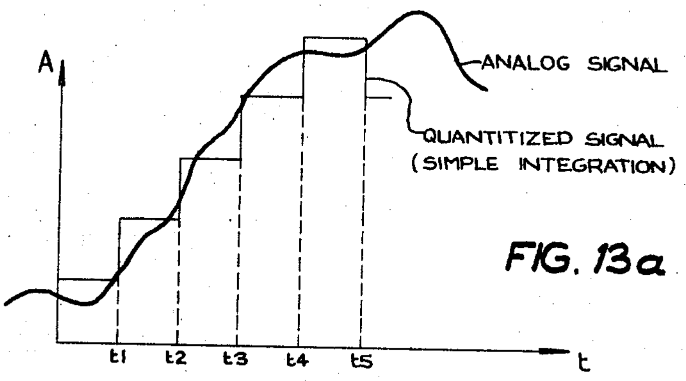
Figure 13B:
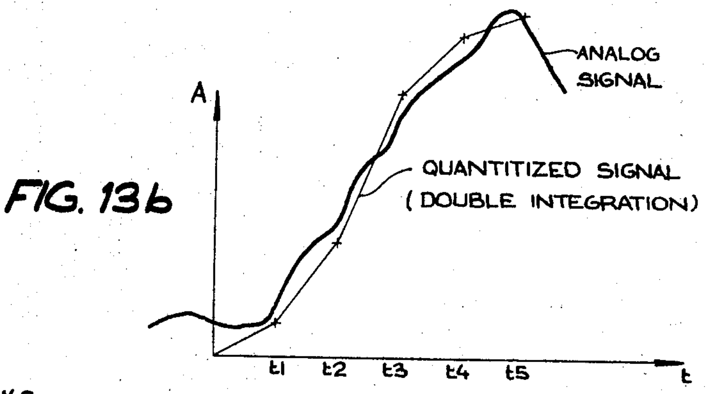
Figure 14:
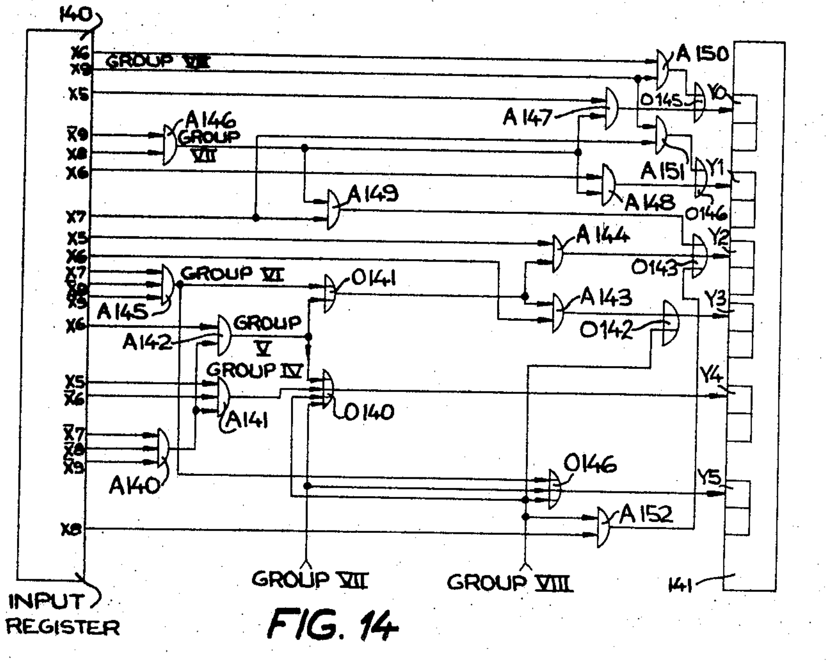
Figure 15:
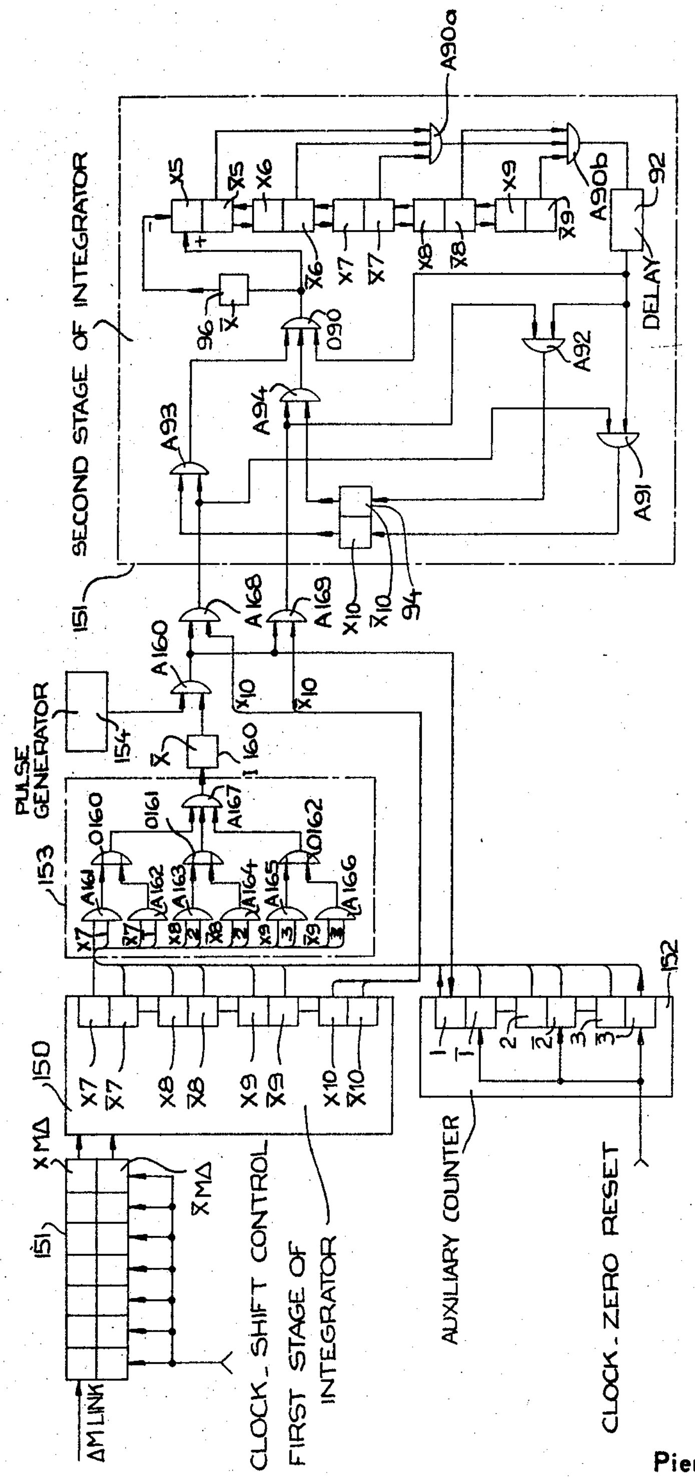
Figure 18:
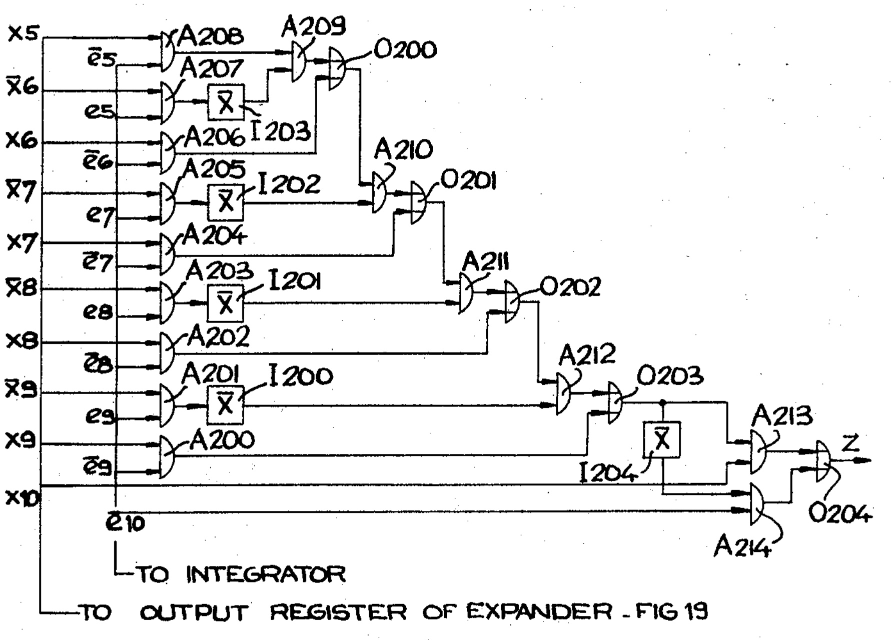
Figure 16:
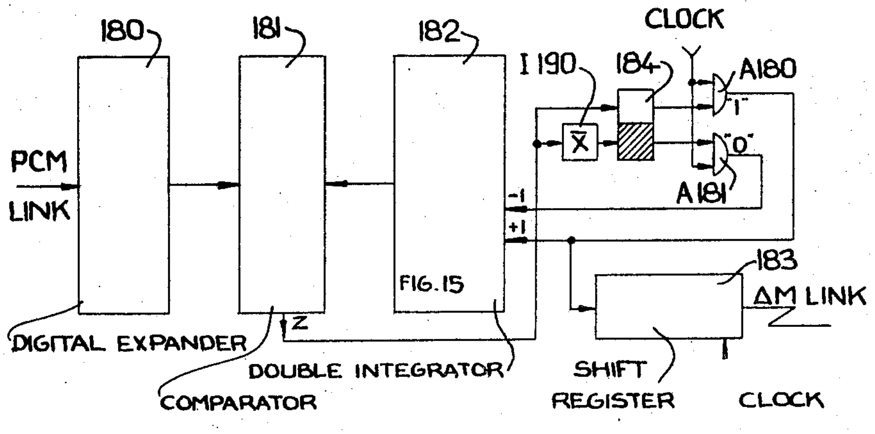
Figure 17:
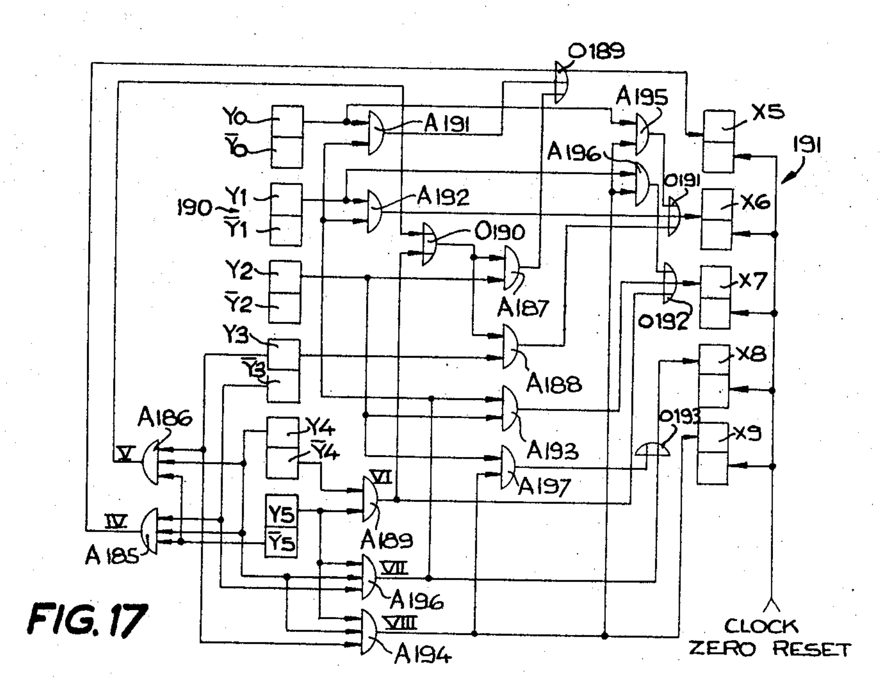
Figure 19:
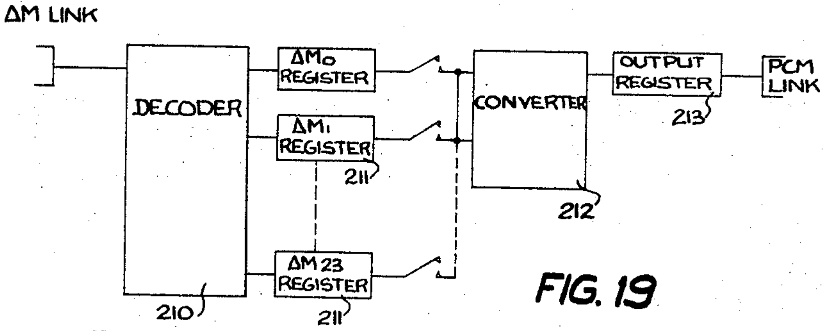
Figure 20:
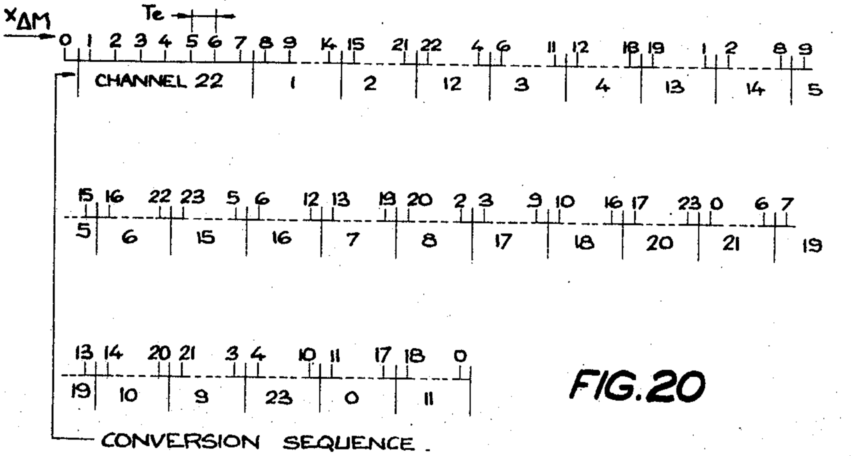

FIGS. 5*a* to 5*g* illustrate circuit diagrams of the compressor;

FIGS. 6*a* to 6*f* illustrate circuit diagrams of an expander for performing the reverse operation of the compressor;

FIG. 7 illustrates a simplified compressor in accordance with the invention;

FIG. 8, which appears on the same sheet as FIGS. 11 and 12, illustrates a simplified expander in accordance with the invention;

FIG. 9 illustrates a "digital integrator" used in the converter of the invention;

FIG. 10 illustrates the complete converter for transforming a ΔM modulation signal into a PCM modulation system including the compressor;

FIG. 11 illustrates a comparator used in the converter for transforming a PCM modulation signal into a ΔM modulation signal;

FIG. 12 illustrates a complete converter for transforming a PCM modulation signal into a ΔM modulation signal including the above-mentioned expander of FIG. 8, integrator of FIG. 9, and comparator of FIG. 11;

FIGS. 13*a* and 13*b* illustrate the principle of double integration as compared to simple integration;

FIG. 14 illustrates a digital compressor used in a converter according to a second embodiment of the invention;

FIG. 15 illustrates a complete converter for transforming a ΔM modulation signal into a PCM modulation system in accordance with the second embodiment of the invention;

FIG. 16 illustrates a converter for transforming a PCM modulation signal into a ΔM modulation signal in accordance with the second embodiment of the invention;

FIG. 17 illustrates the expander used in the converter of FIG. 16;

FIG. 18, which appears on the same sheet as FIG. 16, illustrates the comparator used in FIG. 16;

FIG. 19 illustrates a diagram of a converter used in a system having 24 channels; and FIG. 20 illustrates the order of conversion of the 24 channels in a period T of 125 micro seconds.

Figure 1:
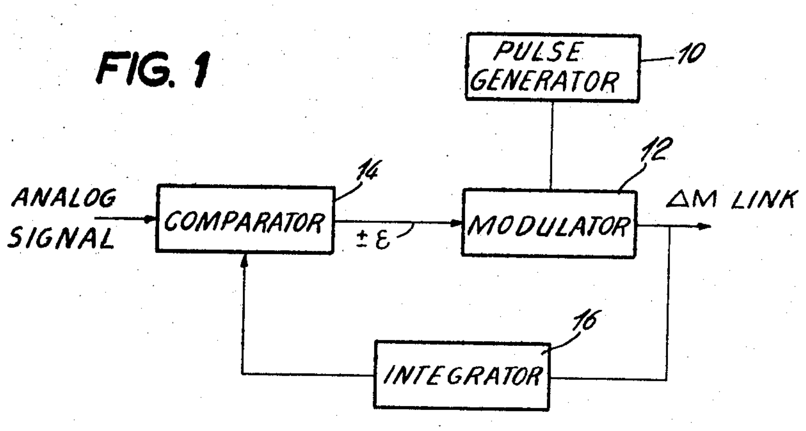
FIG. 1 illustrates a block diagram of the transmitter of a ΔM modulation system.

In FIG. 1, there is shown a well known ΔM transmitter comprising a pulse generator 10 connected to a modulator 12. A comparator 14 compares the instantaneous amplitude of an analog signal applied thereto with the output signal of an integrator 16 in which is stored the amplitude of the analog signal obtained at the time $t_{i-1}$ of taking the preceding sample, and generates an output signal the polarity of which corresponds to the difference between the two signals applied to the comparator. Such output signal is applied to modulator 12 and controls the pulses of the pulse generator 10 applied to modulator 12 so that the modulator generates positive or negative pulses depending on the sign of the signal generated by the comparator 14. The train of positive or negative pulses is generated in accordance with the frequency of the pulse generator 10 which is kept constant. The train of positive and negative pulses is also fed to the integrator 16 which is connected in a feed-back loop to the comparator 14 and causes the output of the integrator 16 to rise or fall depending on the polarity of the pulses applied thereto.

The integrator 16 may be of two types: the simple integration type and the double integration type. In the first case, the output of the integrator is the sum of a series of quantization steps which may be positive or negative in accordance with the pulses of the modulator 12. In the second case, the output of the integrator is a series of straight line segments the slope of which is modified in accordance with the pulses of the modulator. The first embodiment of the invention will disclose a converter for use with an integrator of the simple integration type. The second embodiment of the invention will disclose a converter for use with an integrator of the double integration type.

The following description of the invention will be arranged as follows:

1 — converter: simple integration
- a — characteristics
- b — principles of operation
  - b–1 — ΔM to PCM conversion
  - b–2 — PCM to ΔM conversion
- c — description of ΔM to PCM converter
  - c–1 — digital compressor-expander
  - c–2 — ΔM to PCM converter
- d — description of PCM to ΔM converter
  - d–1 — comparator
  - d–2 — converter 2 — converter: double integration
- a — characteristics
- b — description of ΔM to PCM converter
  - b–1 — digital compressor
  - b–2 — ΔM to PCM converter
- c — description of PCM to ΔM converter
  - c–1 — digital expander
  - c–2 — comparator 3 — operating time
- a — time necessary for one conversion
- b — common circuits 1 — converter: simple integration a — characteristics As commonly known, a signal may only take a definite number of values in quantized systems such as the PCM or ΔM modulation systems. The voltage gap between two successive values is commonly known as a "quantization step" and will be hereinafter designated by symbol $\sigma$.

In the well known PCM modulation system, the signal is compressed, that is the value of the quantization steps varies depending on the instantaneous amplitude of the analog signal. In other words, the quantization steps are smaller for the weaker signals than for the stronger signals. This is done to improve the transmission of the signal by reducing the deficiencies of the so-called quantizing error which results from the difference between the instantaneous value of the analog signal and the quantized value of the same signal. In the ΔM modulation system under consideration, the signal does not undergo any dynamic compression which means that a pulse represents an identical increase of the analog signal no matter what the level of such signal is.

In the North American PCM modulation system having 24 channels, a seven binary digit code and a sampling frequency of 8 KHz is used. The normal sampling period T is 125 micro seconds. Consequently, it becomes necessary to register seven single binary digits of each communication of the ΔM modulation system during such time interval T using a sampling frequency of 56 KHz.

It would be desirable that the equipment used for converting a ΔM modulation signal into a PCM modulation signal be common to a number of channels. This problem will be studied in chapter 3 of the description. The chapters 1 and 2 disclose the principle of the invention assuming that only one ΔM channel is to be converted into one PCM channel or vice-versa.

Various studies have proven that, in the voice band with a sampling frequency of 56 KHz, the ratio between the maximum amplitude A of the signal at the input of a ΔM modulator and the amplitude of a quantization step should be in the order of ten in order to be able to follow an analog signal of a frequency of 800 Hz. To facilitate the design of the converter, it would be desirable that the ratio K of the value of a ΔM modulation quantization step over the value of a PCM modulation quantization step before compression be a power of 2. Since the ratio $A/\sigma\ PCM = 1.024$, $A/\sigma\ \Delta M$ has been chosen to be equal to 8, whereby $K = \sigma\Delta M/\sigma PCM = 1024/8 = 2^7$.

The choice of $\sigma\ \Delta M = A/8$ instead of $A/10$ lowers the signal to noise ratio but increases the maximum frequency of the amplitude signal $A$ which may be transmitted without overload distortion. As it is well known, overload distortion occurs when the quantization step is not large enough or the sampling frequency not high enough to permit the integrator output to follow rapid changes in the instantaneous amplitude of the analog signal.

b — principles of operation b–1 — *ΔM* to *PCM* conversion

Figure 2:
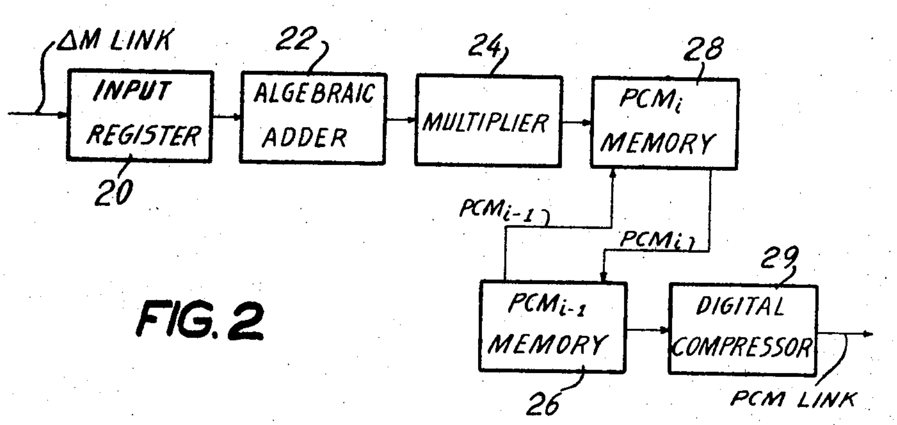
FIG. 2 illustrates a block diagram of a converter in accordance with the invention for converting a ΔM modulation signal obtained by simple integration into a PCM modulation signal.

FIG. 2 illustrates a block diagram of a ΔM to PCM converter in accordance with the invention. During a time interval corresponding to the regular PCM sampling period T of 125 micro seconds, the seven regularly spaced binary digits of one communication are stored in input register 20. Such binary digits consist of a number of positive signals $b$ each represented by digital number 1 and a number of negative signals $c$ each represented by digital number 0. The algebraic increase of the level of the quantized signal is summed in an adder 22 which determines the number $a = b-c$ of $\Delta M$ quantization steps that the signal has increased or decreased during the time interval T.

Since the ratio of the value of a $\Delta M$ quantization step over the value of a *PCM* quantization step has been established as $K = 2^7$, the number $a$ of $\Delta M$ quantization steps is multiplied by such value $K$ in a multiplier 24 to transform such value into a number $d$ representing PCM quantization steps.

The output of multiplier 24 is added to the preceding $PCM_{i-1}$ quantized value of the analog signal stored in a memory 26 to obtain the quantized *PCM* value $PCM_i$ which is stored in a memory 28.

Since the maximum number of successive binary elements of the same polarity in a simple integration $\Delta M$ modulator is 8, this value may be expressed by three binary digits as commonly known. Such value being multiplied by $K = 2^7$, the total number of binary digits representing the amplitude of the signal stored in memory 26 will then be composed of 10 binary digits plus an 11th digit representing the sign of such amplitude. Consequently, it becomes necessary to compress the 11 binary digit signal stored in memory 26 into a seven binary digit signal so as to render the output of the converter compatible with the normal *PCM* link. A digital compressor 29 is thus provided for that purpose.

b–2 — *PCM* to *ΔM* conversion

Figure 3:
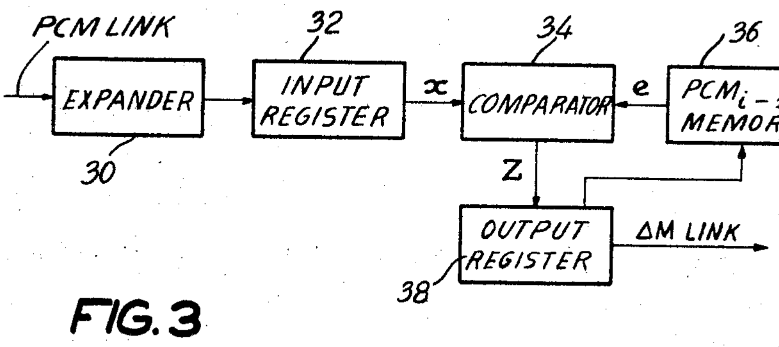
FIG. 3 illustrates a block diagram of a converter for transforming a PCM modulation signal into a ΔM modulation signal.

FIG. 3 illustrates a block diagram of a *PCM* to *ΔM* converter for transforming the *PCM* signal back into a *ΔM* signal at the receiver end of the *PCM* link. The signal appearing on the *PCM* link is expanded into an expander 30 from a seven binary digit number into an 11 binary digit number and fed to an input register 32. Such signal is then compared in a comparator 34 with the quantized value $PCM_{i-1}$ stored in memory 36 at the time of the previous sampling period $T_{i-1}$. The output of comparator 34 represents the algebraic increase or decrease of the signal since the previous sampling period and thus the *ΔM* value of the modulation signal. Such output is stored in an output register 38 and also added to the signal stored in the memory 36 in preparation for the following conversion of the *PCM* modulation signal into its corresponding *ΔM* value.

c — description of the *ΔM* to *PCM* converter c–1 — digital compressor-expander In the general description of the converter in FIGS. 2 and 3 of the drawings, a digital compressor 29 and a digital expander 30 have been mentioned for converting an 11 binary digit number into a seven binary digit number and vice-versa. Such a compressor-expander is the subject of a separate application entitled "PCM Digital Compandor" filed concurrently by the applicant. However, a description of such a compressor-expander will be hereinafter disclosed for the purpose of better understanding the present invention.

In telephony, a ratio of 1,000 is generally accepted between the maximum and minimum amplitudes of a signal which may be transmitted by a *PCM* system. For this reason, the ratio $A/\sigma$ has been chosen to be 1,024 or $2^{10}$. Because of the positive and negative amplitudes of the analog signal, there will be 2,048 or $2^{11}$ quantization steps in a quantized *PCM* system. However, such a value of $\sigma$ is used for weak signals only and various compression laws wherein $\sigma$ depends on the signal level permit to keep the quantizing noise constant and acceptable by using only $2^7$ quantization steps. As it is commonly known, the quantizing noise is caused by the quantizing error resulting from the difference between the instantaneous value of the analog signal and the quantized value of the same signal which is actually transmitted.

The principle of operation of the compressor disclosed in the present application requires the use of a digital compressor in place of the commonly known analog compressor used up until now in North America.

The compression law which will be used in the digital compressor is as follows:

$$y = [\ln(1+\mu x)]/[\ln(1+\mu)]$$

wherein $y$ = output signal, $x$ = input signal, $\mu = 100$.

Figure 4:
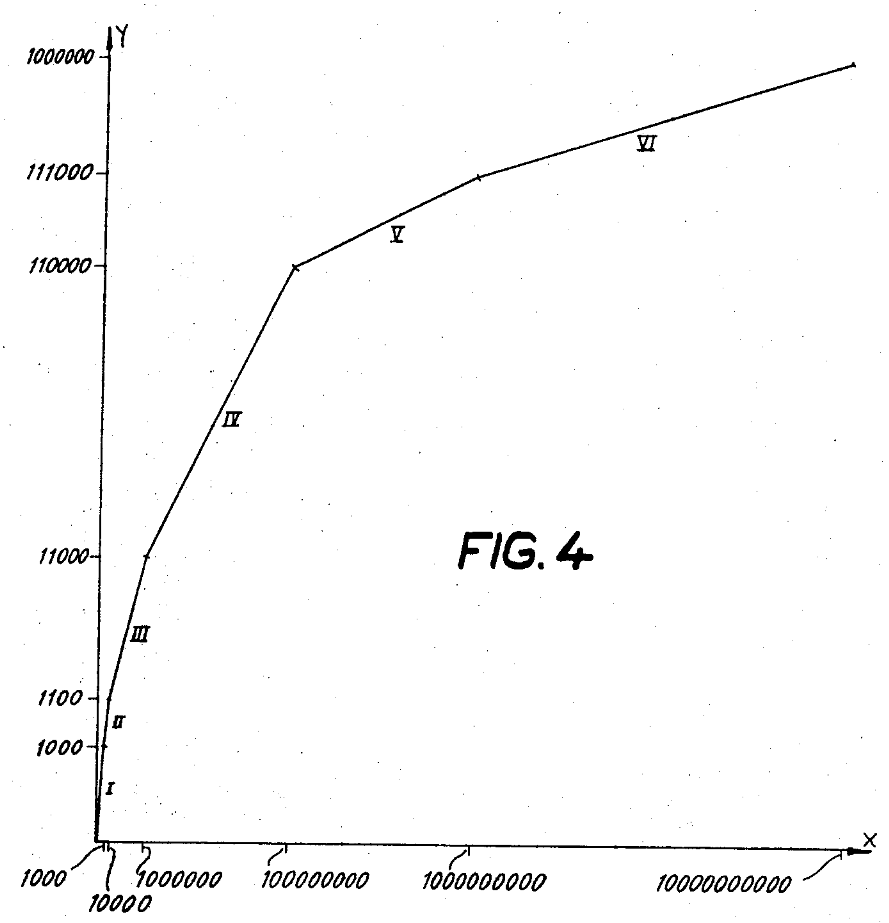
FIG. 4 illustrates a piecewise linear characteristic used for approximating the nonlinear characteristic of a compressor suitable for use in the converter in accordance with the invention wherein the scales are indicated by binary numbers but nevertheless linear.

The curve obtained in following this law is approached by six straight line segments as illustrated in FIG. 4 of the accompanying drawings. However, it is to be understood that any other compression law could be used.

It is possible to code the amplitude of an analog signal in two ways:

1. the level varies between 0 and $+2A$ and the quantization steps are numbered 1 to $2^n$ using a number having $n$ binary digits;
2. the level varies between $+A$ and $-A$ and the quantization steps are characterized by a number having $n-1$ binary digits representing the amplitude and an extra binary digit representing the sign (+ or −) of such amplitude.

The second solution has been retained because it requires less equipment. In FIG. 4 it is only necessary to determine to which group among the six different groups (segments) belongs the binary number and on the other hand, what is its sign. This only requires 6 + 1 = 7 identification circuits. On the contrary, the first solution would have required to determine to which group among eleven groups the binary number belongs.

It is therefore necessary to transform a number $x$ having 10 binary digits (the 11 digit being the sign) into a number $y$ having six binary (the seventh digit being the sign). The coordinates of the extremities of the segments are as follows expressed in a system using binary numbers:

| | |
|---|---|
| $x$ = 0 0 0 0 0 0 0 0 0 0, | $y$ = 0 0 0 0 0 0 |
| 1 0 0 0, | 1 0 0 0 |
| 1 0 0 0 0, | 1 1 0 0 |
| 1 0 0 0 0 0 0, | 1 1 0 0 0 |
| 1 0 0 0 0 0 0 0 0, | 1 1 0 0 0 0 |
| 1 0 0 0 0 0 0 0 0 0, | 1 1 1 0 0 0 |
| 1 0 0 0 0 0 0 0 0 0 0, | 1 0 0 0 0 0 0 |

However, to facilitate the distinction of the groups, eight groups have been formed as illustrated in the following Table 1 by breaking the third and fourth segments into two segments each.

TABLE 1

Intervals

| Group Number | x element from | | y element from | |
|---|---|---|---|---|
| I | 0, | 111 | 0, | 111 |
| II | 1000, | 1111 | 1000, | 1011 |
| III | 10000, | 11111 | 1100, | 1111 |
| IV | 100000, | 111111 | 10000, | 10111 |
| V | 1000000, | 1111111 | 11000, | 11111 |
| VI | 10000000, | 11111111 | 100000, | 101111 |
| VII | 100000000, | 111111111 | 110000, | 110111 |
| VIII | 1000000000, | 1111111111 | 111000, | 111111 |

The equations of the eight segments expressed in binary numbers are as follows:

Equations of Segments

| Group Number | Group Number |
|---|---|
| I $y = x$ | II $y = x/10 + 100$ |
| III $y = x/100 + 1000$ | IV $y = x/100 + 1000$ |
| V $y = x/1000 + 10000$ | VI $y = x/1000 + 10000$ |
| VII $y = x/100000 + 101000$ | VIII $y = x/1000000 + 110000$ |

Referring to the above equations, it may be seen that the slopes of the various segments are: 1, 1/10, 1/100, 1/1000, 1/100,000, 1/1,000,000.

It is to be noted that the numbers in each group before and after transformation consist of one or plural group identification digits and of plural digits which indicate the level of the number in each group. For example, if the binary digits are numbered $x_9$ to $x_0$ in the order of their decreasing weights, a number $x$ in group II is composed of seven group identification digits (0000001) and of three digits indicating the level of the number in each group ($x_2$, $x_1$, $x_0$). The transformation of $x$ in this group II is $y = (x/10) + 100$ which consists of four group identification digits ($y_5$ to $y_2$ : 0010) and two digits indicating the level in the group. This may be represented by the following equation:

$$x = 0000001x_2x_1x_0,\ y = 0010x_2x_1$$

Using the same convention, the transformation in the eight groups will be as follows:

Group I $x = 0\,0\,0\,0\,0\,0\,0\,x_2\,x_1\,x_0,\ y = 0\,0\,0\,x_2\,x_1\,x_0$

II $x = 0\,0\,0\,0\,0\,0\,1\,x_2\,x_1\,x_0,\ y = 0\,0\,1\,0\,x_2\,x_1$

III $x = 0\,0\,0\,0\,0\,1\,x_3x_2\,x_1\,x_0,\ y = 0\,0\,1\,1\,x_3\,x_2$

IV $x = 0\,0\,0\,0\,1\,x_4x_3x_2\,x_1\,x_0,\ y = 0\,1\,0\,x_4\,x_3\,x_2$

V $x = 0\,0\,0\,1\,x_5x_4x_3x_2\,x_1\,x_0,\ y = 0\,1\,1\,x_5\,x_4\,x_3$

VI $x = 0\,0\,1\,x_6x_5x_4x_3x_2\,x_1\,x_0,\ y = 1\,0\,x_6x_5\,x_4\,x_3$

VII $x = 0\,1\,x_7x_6x_5x_4x_3x_2\,x_1\,x_0,\ y = 1\,1\,0\,x_7\,x_6\,x_5$

VIII $x = 1\,x_8x_7x_6x_5x_4x_3x_2\,x_1\,x_0,\ y = 1\,1\,1\,x_8\,x_7\,x_6$

The transfer of a number in each of groups I-VIII from 10 to 6 binary elements is illustrated in the following table 2 wherein the "0" have been eliminated.

TABLE 2

| Binary Element No. | Group Number I | II | III | IV | V | VI | VII | VIII |
|---|---|---|---|---|---|---|---|---|
| 1 | $x_0$ | $x_1$ | $x_2$ | $x_2$ | $x_3$ | $x_3$ | $x_5$ | $x_6$ |
| 2 | $x_1$ | $x_2$ | $x_3$ | $x_3$ | $x_4$ | $x_4$ | $x_6$ | $x_7$ |
| 3 | $x_2$ | | $x_4$=1 | $x_4$ | $x_5$ | $x_5$ | $x_7$ | $x_8$ |
| 4 | | 1 | 1 | | $x_6$=1 | $x_6$ | | 1 |
| 5 | | | | 1 | 1 | | 1 | 1 |
| 6 | | | | | | 1 | 1 | 1 |

Table 2 mentioned above suggests a method for effecting the transformation. It will be necessary to:

1. identify the group to which $x$ belongs (for example, 0000001 $x_2 x_1 x_0$, is a number in group II);

2. transfer the useful 2, 3 or 4 $x_i$ in a register having six positions;

3. store in the register the group identification digit.

The above-mentioned operations 2 and 3 may be effected simultaneously.

If the six position register is empty before transferring any numbers into it, Table 2 indicates the elements to be placed in it.

The identification functions of each of the groups are:

I $G_1=\bar{x}_9\bar{x}_8\bar{x}_7\bar{x}_6\bar{x}_5\bar{x}_4\bar{x}_3$
II $G_2=\bar{x}_9\bar{x}_8\bar{x}_7\bar{x}_6\bar{x}_5\bar{x}_4x_3$
III $G_3=\bar{x}_9\bar{x}_8\bar{x}_7\bar{x}_6\bar{x}_5x_4$
IV $G_4=\bar{x}_9\bar{x}_8\bar{x}_7\bar{x}_6x_5$
V $G_5=\bar{x}_9\bar{x}_8\bar{x}_7x_6$
VI $G_6=\bar{x}_9\bar{x}_8x_7$
VII $G_7=\bar{x}_9x_8$
VIII $G_8=x_9$ FIGS. 5*a* to 5*f* illustrate electrical diagrams of the transfer circuits required for each group of numbers to effectuate the transformation of Table 2. Such transfer circuits include AND gates $A_1$ to $A_{25}$ and OR gates $O_1$ to $O_5$. An input register 50 and an output register 51 are illustrated for each of the groups for convenience purposes although a single input register 50 and a single output register 51 would be used in practice for all the groups.

Taking the groups separately in consecutive order, it will be seen that a number in group I the identification digits $x_9\,x_8\,x_7\,x_6\,x_5\,x_4\,x_3$ of which are equal to 0 0 0 0 0 0 0 will permit gate $A_4$ to conduct to provide a digital output "1" to the first input of gates $A_1$, $A_2$ and $A_3$ to permit such gates to transfer binary digits $x_0$, $x_1$ $x_2$ stored in the input register 50 of the compressor into the proper storage elements of the output register 51 of the compressor through OR gates $O_1$ to $O_3$ in accordance with the above-mentioned Table 2. Since only one output register 51 is used in practice, only one set of OR gates $0_1$ to $0_3$ is needed for all the groups. The output of AND gates $A_1$ to $A_3$ is therefore applied to the first input of OR gates $O_1$ to $O_3$.

The group identification digits of a number in group II having the form 0 0 0 0 0 0 1 will render gate $A_7$ conductive and thereby apply a digital signal "1" to the first input of gates $A_5$ and $A_6$, this causing the transfer of binary digits $x_1$ and $x_2$ from the input register of the compressor into the proper storage elements $y_0$ and $y_1$ of the output register through the second input of OR gates $O_1$ and $O_2$.

A number in group III having the following identification digits 0 0 0 0 0 1 will render gate $A_{11}$ conductive and apply a digital signal "1" to the first input of gates $A_8$, $A_9$ and $A_{10}$ through OR gate $O_4$, thus causing the transfer of digits $x_2$, $x_3$ and $x_4$ of the input register of the compressor into the proper storage elements $y_0$, $y_1$ and $y_2$ of the output register thereof through the third input of OR gates $O_1$ to $O_3$.

A number in group IV having the following identification digits 0 0 0 0 1 will render gate $A_{12}$ conductive and thus apply a digital input "1" to gates $A_8$, $A_9$ and $A_{10}$, thus causing the transfer of digits $x_2$, $x_3$ and $x_4$ in the input register of the compressor into the storage elements $y_0$, $y_1$ and $y_2$ of the output register. It will be noted that the identification digits of groups III and IV are both applied through OR gate $O_4$ to the same transfer gates $A_8$, $A_9$ and $A_{10}$. Indeed, $x_2$, $x_3$ and $x_4$ must be transferred into storage elements $y_0$, $y_1$ and $y_2$ in both groups, the only difference being that $x_4 = 1$ in group III.

A number in group V having the following identification digits 0 0 0 1 will render gate $A_{17}$ conductive and thus apply a digital signal "1" to the first input of gates $A_{13}$ to $A_{16}$ through OR gate $O_5$, thus transferring digits $x_3$, $x_4$, $x_5$ and $x_6$ in the input register of the compressor into the storage elements $y_0$, $y_1$, $y_2$ and $y_3$ of the output register of the compressor.

The output of AND gates $A_{13}$, $A_{14}$ and $A_{15}$ is applied to the register through the fourth input of OR gates $O_1$ $O_2$ and $O_3$ respectively.

A number in group VI having the identification digits 0 0 1 will render gate $A_{18}$ conductive thus transferring digits $x_3$, $x_4$, $x_5$ and $x_6$ into storage elements $y_0$, $y_1$, $y_2$ and $y_3$. It will be noted that the output of gates $A_{17}$ and $A_{18}$ are both applied through OR gate $O_5$ to gates $A_{13}$ to $A_{16}$. This is because the same digits $x_3$, $x_4$, $x_5$ and $x_6$ are to be transferred into storage elements $y_0$, $y_1$, $y_2$ and $y_3$ in both groups V and VI except that in group V, $x_6 = 1$.

An element in group VII having the following identification digits 0 1 will render gate $A_{22}$ conductive thus applying a digital signal "1" to gates $A_{19}$, $A_{20}$ and $A_{21}$ and transferring digits $x_5$, $x_6$ and $x_7$ into the storage elements $y_0$, $y_1$ and $y_2$ through the fifth input of OR gates $O_1$ to $O_3$.

A number in group VIII having the identification digit 1 will apply a digital signal "1" to gates $A_{23}$, $A_{24}$ and $A_{25}$ thus transferring digits $x_6$, $x_7$ and $x_8$ into the storage elements $y_0$, $y_1$ and $y_2$.

Figure 5A:
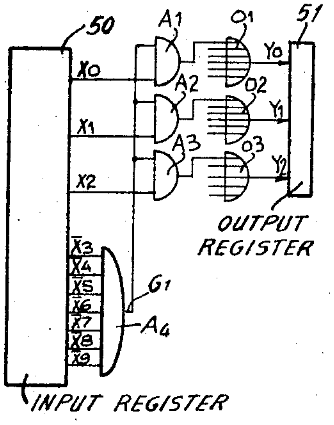
Figure 5B:
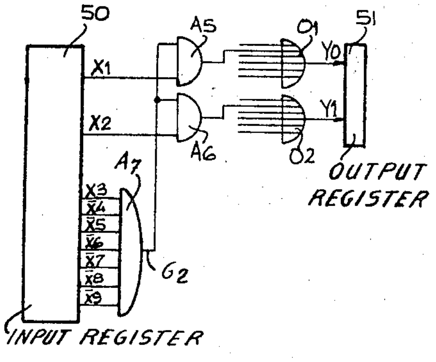
Figures 5C, 5D:
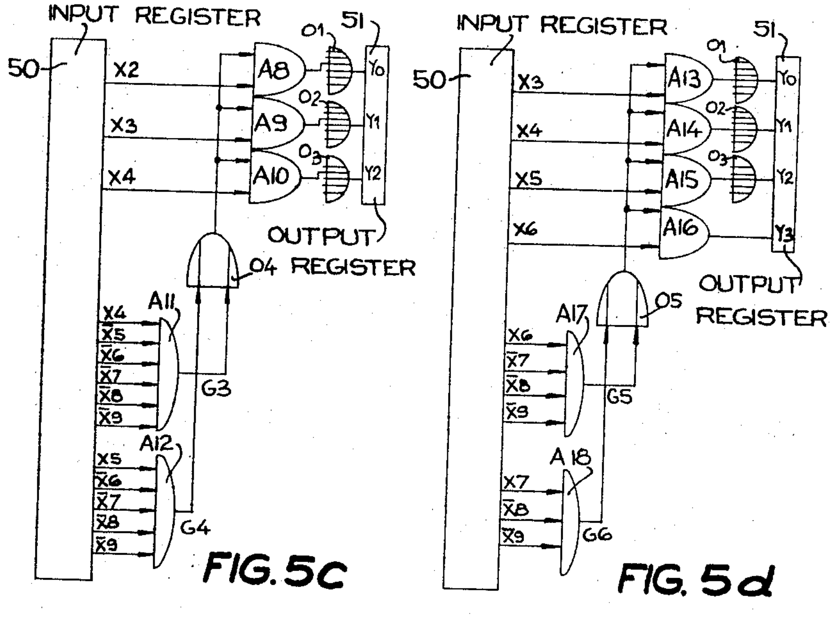
Figure 5E:
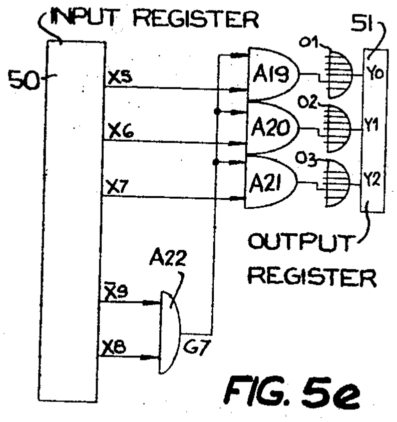
Figure 5F:
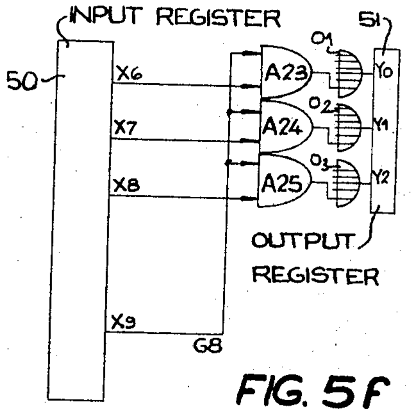
Figure 5G:
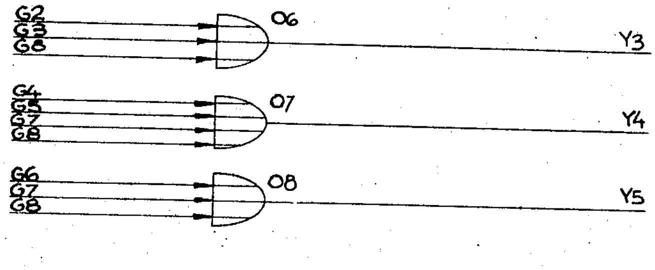
Figures 6A, 6B, 6C, 6D, 6E, 6F:
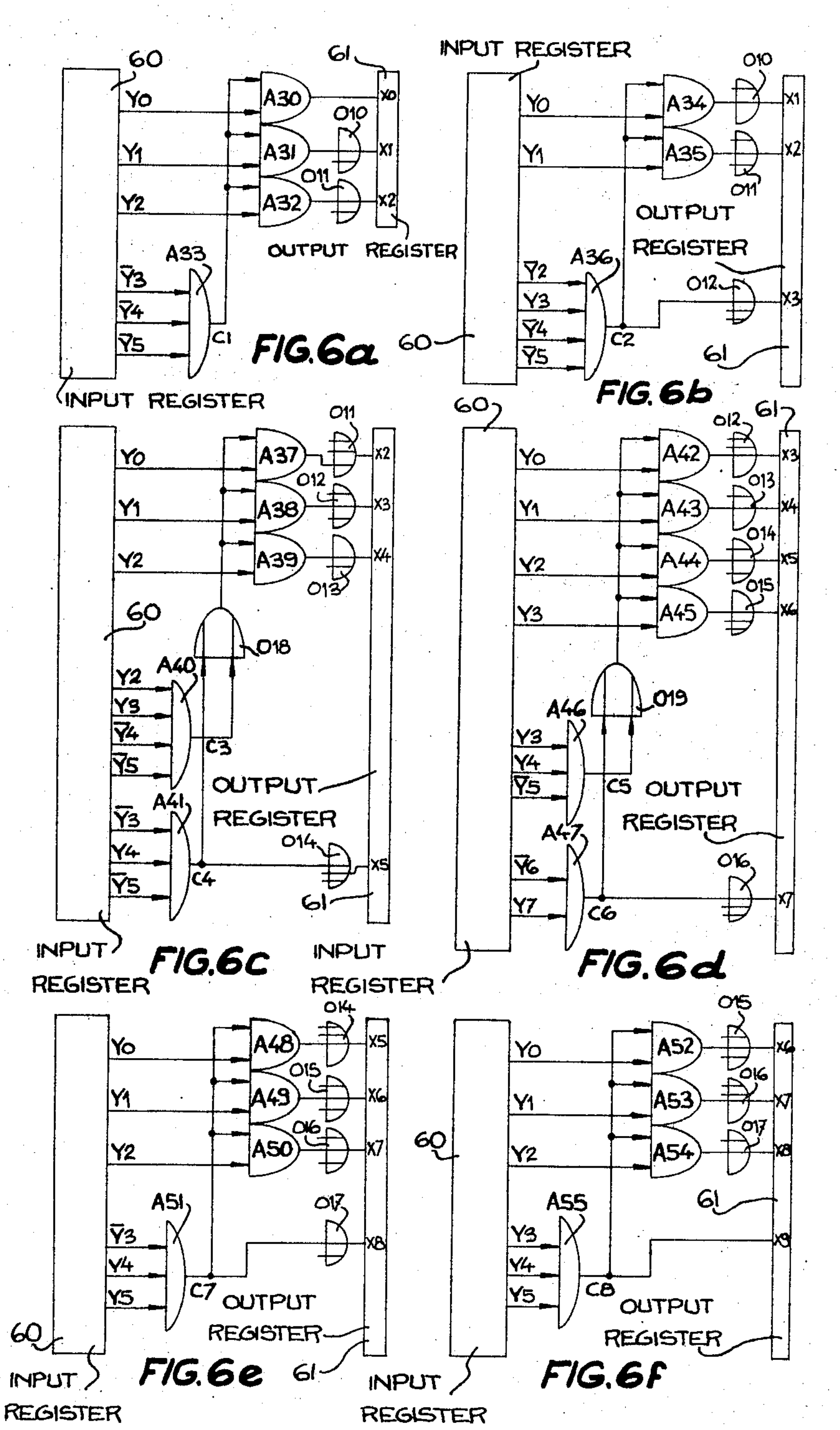

FIG. 5*g* illustrates the storage of the identification digits for each of the groups I to VIII. There is shown an OR gate $O_6$ to which is applied the signals $G_2$, $G_3$ and $G_8$, an OR gate $O_7$ to which is applied the identification signals $G_4$, $G_5$, $G_7$ and $G_8$, and OR gate $O_8$ to which is applied the identification signals $G_6$, $G_7$ and $G_8$, such identification signals being illustrated in FIGS. 5*a* to 5*f*. One of the identification signals $G_1$ to $G_8$ becomes equal to 1 when a number pertaining to a predetermined group occurs while the remaining identification signals remain equal to zero. For example, a number in group I causes $G_1$ alone to be equal to 1 and, consequently, digits $y_3$, $y_4$ and $y_5$ in the storage elements of the output register remain equal to zero.

A number in group II causes a digit 1 to be applied to OR gate $O_6$ to change the state of $y_3$ into the state 1 while $y_2$, $y_4$ and $y_5$ remain in the state zero.

A number in group III causes a digit $y_3 = 1$ to be stored in the output register while $y_4$ and $y_5$ remain equal to zero. In addition, a digit 1 is stored in storage element $y_2$ by the transfer circuit of FIG. 5*c*.

A number in group IV causes a digit 1 to be applied to OR gate $O_7$ to change the state of $y_4$ into the state 1 while $y_3$ and $y_5$ remain equal to zero.

A number in group V causes a digit 1 to be applied to OR gate $O_7$ to change the state of $y_4$ into state 1 while $y_5$ remains equal to 0. In addition, a digit 1 is stored into storage element $y_3$ by the circuit of FIG. 5*d*.

An element in group VI causes a signal 1 to be applied to OR gate $O_8$ to change the state of $y_5$ into state 1 while $y_4$ remains equal to zero.

An element in group VII causes a digit 1 to be applied to both OR gates $O_7$ and $O_8$ thus changing the states of $y_4$ and $y_5$ into state 1 while $y_3$ remains equal to zero.

An element in group VIII causes a digit 1 to be applied to OR gates $O_6$, $O_7$ and $O_8$ to change the state of $y_3$, $y_4$ and $y_5$ into state 1.

The purpose of the digital expander is to transform a signal having seven binary elements back into a signal having 11 binary elements in which $\sigma$ is constant for all amplitudes of the signal. The compression law is opposite to that of the compressor, that is if $y$ is the input number having six binary elements $x$, the output number, will have 10 binary elements. The equations are as follows:

Group I $y = 0\,0\,0\,y_2\,y_1\,y_0,\ x = 0\,0\,0\,0\,0\,0\,0\,y_2\,y_1\,y_0$
II $y = 0\,0\,1\,0\,y_1\,y_0,\ x = 0\,0\,0\,0\,0\,0\,1\,y_1\,y_0\,0$
III $y = 0\,0\,1\,1\,y_1\,y_0,\ x = 0\,0\,0\,0\,0\,1\,y_1 y_0\,0\,0$
IV $y = 0\,1\,0\,y_2\,y_1\,y_0,\ x = 0\,0\,0\,0\,1\,y_2 y_1 y_0\,0\,0$
V $y = 0\,1\,1\,y_2\,y_1\,y_0,\ x = 0\,0\,0\,1\,y_2 y_1 y_0\,0\,0\,0$
VI $y = 1\,0\,y_3 y_2\,y_1\,y_0,\ x = 0\,0\,1\,y_3 y_2 y_1 y_0\,0\,0\,0$
Group VII $y = 1\,1\,0\,y_2\,y_1\,y_0,\ x = 0\,1\,y_2 y_1 y_0\,0\,0\,0\,0\,0$
VIII $y = 1\,1\,1\,y_2\,y_1\,y_0,\ x = 1\,y_2 y_1 y_0\,0\,0\,0\,0\,0\,0$ The transformation method is the same as for the compressor. If the 10 position register is empty before the transfer, the following Table 3 indicates the elements to be placed into it.

TABLE 3

| Binary Element No. | Group Number I | II | III | IV | V | VI | VII | VIII |
|---|---|---|---|---|---|---|---|---|
| 1 | $y_0$ | | | | | | | |
| 2 | $y_1$ | $y_0$ | | | | | | |
| 3 | $y_2$ | $y_1$ | $y_0$ | $y_0$ | | | | |
| 4 | | 1 | $y_1$ | $y_1$ | $y_0$ | $y_0$ | | |
| 5 | | | $y_2=1$ | $y_2$ | $y_1$ | $y_1$ | | |
| 6 | | | | 1 | $y_2$ | $y_2$ | $y_0$ | |
| 7 | | | | | $y_3=1$ | $y_3$ | $y_1$ | $y_0$ |
| 8 | | | | | | 1 | $y_2$ | $y_1$ |
| 9 | | | | | | | 1 | $y_2$ |
| 10 | | | | | | | | 1 |

The identification functions of each of the groups are:

I $C_1 = \bar{y}_5\,\bar{y}_4\,\bar{y}_3$
II $C_2 = \bar{y}_5\,\bar{y}_4\,y_3\,\bar{y}_2$
III $C_3 = \bar{y}_5\,\bar{y}_4\,y_3\,y_2$
IV $C_4 = \bar{y}_5\,y_4\,\bar{y}_3$
V $C_5 = \bar{y}_5\,y_4\,y_3$
VI $C_6 = y_5\,\bar{y}_4$
VII $C_7 = y_5\,y_4\,\bar{y}_3$
VIII $C_8 = y_5\,y_4\,y_3$ FIGS. 6a to 6f illustrate each of the transfer circuits of the expander including AND gates $A_{30}$ to $A_{55}$ and OR gates $O_{10}$ and $O_{19}$. An input register 60 and an output register 61 are illustrated for each group for convenience purposes only, although a singe input register 60 and a single output register 61 would be used in practice for all the groups. As in FIGS. 5a to 5f, OR gates $O_{10}$ to $O_{17}$ located at the input of the register 61 are common to at least two of the FIGS. 6a to 6f.

A number in group I the identification digits $y_5\,y_4\,y_3$ of which are 0 0 0 will render gate $A_{33}$ conductive and apply a digital signal 1 to AND gates $A_{30}$, $A_{31}$ and $A_{32}$ thus transferring digits $y_0$, $y_1$ AND $y_2$ of the input register 60 of the expander into the storage elements $x_0$, $x_1$ and $x_2$ of the output register 61 of the expander. The output of AND gates $A_{31}$ AND $A_{32}$ is applied to the first input of OR gates $O_{10}$ and $O_{11}$ respectively.

An element in group II the identification digits $y_5\,y_4\,y_3\,y_2$ of which are 0 0 1 0 will render gate $A_{36}$ conductive thus applying a digital signal 1 to gates $A_{34}$ and $A_{35}$ to transfer digits $y_0$ and $y_1$ into storage elements $x_1$ and $x_2$ through the second input of gates $0_{11}$ and $9_{12}$.

A number in group III the identification digits $y_5\,y_4\,y_3\,y_2$ of which are 0 0 1 1 will render gate $A_{40}$ conductive thus applying a digital signal 1 to gates $A_{37}$, $A_{38}$ and $A_{39}$ through OR gate $O_{18}$ to transfer digits $y_9$, $y_1$ and $y_2$ into storage elements $x_2$, $x_3$ and $x_4$. The output of AND gates $A_{37}$ to $A_{39}$ is applied to the output register through the appropriate inputs of OR gates $O_{11}$ to $O_{13}$.

An element in group IV the identification digits of which are 0 1 0 will render gates $A_{41}$ conductive thus applying a digital signal 1 to gates $A_{37}$, $A_{38}$ and $A_{39}$ and transferring digits $y_0$, $y_1$ and $y_2$ into storage elements $x_2$, $x_3$ and $x_4$. It is to be noted that the identification of both groups III and IV is performed by the same transfer circuit through OR gate $O_{18}$. It is because the same digits $y_0$, $y_1$ and $y_2$ are transferred in both groups except that for group III, $y_2 = 1$.

A number in group V having identification digits 0 1 1 will render gate $A_{46}$ conductive thus applying a digital signal 1 to gates $A_{42}$ to $A_{45}$ through OR gate $O_{19}$ to transfer digits $y_0$, $y_1$, $y_2$ and $y_3$ into storage elements $x_3$, $x_4$, $x_5$ and $x_6$ through OR gates $O_{12}$ to $O_{15}$ respectively.

An element in group VI having identification digits 10 will render gate $A_{47}$ conductive thus applying a digital signal 1 to gates $A_{42}$ to $A_{45}$ and transferring digits $y_0$, $y_1$, $y_2$ and $y_3$ into storage elements $y_3$, $x_4$, $x_5$ and $x_6$. It is to be noted that groups V and VI use the same transfer circuit because in both groups the same digits $y_0$, $y_1$, $y_2$ and $y_3$ are to be transferred into $x_3$, $x_4$, $x_5$ and $x_6$ except that $y_3 = 1$ in group V.

An element in group VII having identification digits 1 1 0 will render gate $A_{51}$ conductive thus applying a digital signal 1 to gates $A_{48}$ to $A_{50}$ and transferring digits $y_0$, $y_1$ and $y_2$ into storage elements $x_5$, $x_6$ and $x_7$ through the appropriate inputs of OR gates $o_{14}$ to $0_{16}$.

An element in group VIII having identification digits 1 1 1 will render gate $A_{55}$ conductive thus applying a digital signal 1 to gates $A_{52}$ to $A_{54}$ and transferring digits $y_0$, $y_1$ and $y_2$ into storage elements $x_6$, $x_7$ and $x_8$ through the appropriate inputs of OR gates $O_{15}$ to $O_{17}$.

The storage of the group identification digits is as follows;

a. a number in group I leaves storage elements $x_3$ to $x_9$ unchanged and thus equal to zero;

b. a number in group II stores a digit 1 in storage element $x_3$ while $x_4$ to $x_9$ remain equal to zero;

c. a number in group III stores a digit 1 in storage element $x_4$ while leaving storage elements $x_5$ to $x_9$ equal to zero;

d. a number in group IV stores a digit 1 in storage element $x_5$, while leaving storage elements $x_6$ to $x_9$ unchanged;

e. a number in group V stores a digit 1 in storage element $x_6$ while leaving storage elements $x_7$ to $x_9$ unchanged;

f. a number in group VI will store a digit 1 in storage element $x_7$ while leaving storage elements $x_8$ and $x_9$ unchanged;

g. a number in group VII will store a digit 1 in $x_8$ while leaving $x_9$ unchanged;

h. a number in group VIII will store a digit 1 in storage element $x_9$.

Having described a *PCM* compressor-expander, it will now be interesting to see how such a compressor-expander may be simplified when applied to a $\Delta M$ to *PCM* modulator in accordance with the invention or vice versa. Indeed, we have seen previously in connection with the general description of FIG. 2 that K, the multiplication factor of multiplier 24 was $2^7$. This means that the first seven binary digits of the number appearing in the input register of compressor 29 will always be zero. In other words, binary digits $x_9\, x_8\, x_7$ only will be significant and digits $x_6\, x_5\, x_4\, x_3\, x_2\, x_1\, x_0$ will be equal to zero ($x_9\, x_8\, x_7$ 0 0 0 0 0 0 0 ). Consequently, Table 2 above will be simplified as follows:

Table 4

| Binary Element Number | Group Number VI | VII | VIII |
|---|---|---|---|
| 1 | | | |
| 2 | | | $x_7$ |
| 3 | | $x_7$ | $x_8$ |
| 4 | | | 1 |
| 5 | | 1 | 1 |
| 6 | 1 | 1 | 1 |

It may be seen from Table 4 that in all groups VI, VII and VIII, the first binary digit $y_0$ is equal to 0 and that the last binary digit $y_5$ is always equal to 1. Therefore an output register having only four storage elements in sufficient to store the number. The output register connections for digit $y_0$ in group VI and $y_5$ in group VIII may be permanent. The transfer circuits illustrated in FIG. 5 may then be simplified and the digital compressor will look as illustrated in FIG. 7 wherein AND gates $A_{21}$, $A_{24}$ AND $A_{25}$ and OR gates $O_3$ and $O_7$ only remain from the great number of gates in FIG. 5. In addition, input register 70 contains only three storage elements and output register 71 four storage elements. The synchronization control originating from the clock is not shown.

In operation, a number in group VI has its elements $y_1$, $y_2$, $y_3$ and $y_4$ equal to zero and the identification thereof becomes useless.

A number in group VII having identification digits 0 1 will open gate $A_{22}$ and apply a signal 1 to AND gate $A_{21}$ and to OR gate $O_7$. Such will transfer digit $x_7$ into storage element $y_2$ through OR gate $O_3$ and store digit 1 into storage element $y_4$ through OR gate $O_7$.

A number belonging to group VIII having identification digit 1 will apply a digital signal 1 to the input of gates $A_{24}$ and $A_{25}$ to transfer digit $x_7$ into storage element $y_1$ and digit $x_8$ into storage element $y_2$ through OR gate $O_3$. In addition, it will automatically store digit 1 into storage element $y_3$ and into storage element $y_4$ through OR gate $O_7$.

The storage elements 71 of the compressor may be reset to zero by a clock as illustrated diagrammatically.

The expander 30 shown schematically in FIG. 6 will also be greatly simplified by the fact that digits $x_0$ to $x_6$ are null. Consequently, the above Table 3 will look as follows.

Table 5

| Binary Element Number | Group Number VI | VII | VIII |
|---|---|---|---|
| 8 | 1 | $y_2$ | $y_1$ |
| 9 | | 1 | $y_2$ |
| 10 | | | 1 |

The above Table 5 shows that a three digit output register only is required for the expander of FIG. 6. FIG. 8 illustrates that AND gates $A_{50}$, $A_{51}$, $A_{53}A_{54}$ and $A_{55}$ and OR gates $O_{16}$ and $O_{17}$ only are required from the great number of gates illustrated in FIG. 6. In addition, input register 80 contains only four storage elements and output register 81 contains only three storage elements. The circuit operates as follows:

A number belonging to group VI having identification digits 1 0 is identified by $\bar{y}_4 = 1$ and a digit 1 is placed in the storage element $x_7$ of the output register through OR gate $O_{16}$.

A number belonging to group VII having identification digits 1 1 0 is identified by AND gate $A_{51}$ which applies a digit 1 to AND gate $A_{50}$ thus transferring $y_2$ into storage element $x_7$ through OR gate $O_{16}$ and 1 into storage element $x_8$ through OR gate $O_{17}$.

A number belonging to group VIII having identification digits 1 1 1 is identified by AND gate $A_{55}$ which applies a digit 1 to AND gates $A_{53}$ and $A_{54}$ thus transferring digits $y_1$ and $y_2$ into storage elements $x_7$ and $x_8$ through OR gates $O_{16}$ and $O_{17}$ respectively. In addition, AND gate $A_{55}$ stores a digit 1 into storage element $x_9$.

*c*–2 — $\Delta M$ to *PCM* converter

Returning now to the description of the converter, the seven binary digits of one communication of a period *T* are successively stored into a shift register 20 (FIG. 2) having seven storage elements. After a time $T - (T/7)$, the seven binary digits are available for calculating the new PCM value of the $\Delta M$ signal.

This calculation must be done between time interval $T - (T/7)$ and $T$ in order to be able to empty the shift register for the following sampling period. Otherwise, a temporary memory would have to be provided to store the digits before processing them.

It is to be noted that even if a common equipment is used for plural channels, a $\Delta M$ shift register 20 will still be required for each channel. Furthermore, the time interval $T/7$ is independent of the number of channels using the same equipment. This problem will be discussed more fully in chapter 3 of the description.

During a time $T-(T/7)$, the binary digits previously registered appear, under the control of a clock, one after the other at the output of the register 20. The input of the following element of the converter receives the seven binary digits in the order of their appearance on the *PCM* link at a speed which permits the processing thereof.

The operation of the $\Delta M$ to *PCM* or *PCM* to $\Delta M$ converter is very similar to the operation of a $\Delta M$ demodulator or modulator and, by analogy, it will be called "a digital integrator."

As mentioned previously in connection with the description of FIG. 2, the three fundamental operations to be performed are: a) algebraic sum of the positive and negative pulses in a reversible counter ($a = b-c$); b) multiplication ($d = Ka$); and c) addition of $d$ to the previously determined $PCM_{t-1}$ value to obtained a new $PCM_t$ value.

However, it is equivalent to calculate $Kb$,$Kc$ and $d = Kb-Kc$ and to algebraically add the value $d$ to the previously determined $PCM_{t-1}$ value. It is therefore simpler to use a reversible counter having a capacity sufficient to store the full *PCM* value and to successively feed to it the $+K$ (positive pulses) and $-K$ (negative pulses). If $K$ is chosen to be $2^7$, the multiplication is a simple shift of seven binary digits in the binary counter. Consequently, the operation results in the counting of pulses in a counter having only three binary storage elements $x_9\,x_8\,x_7$ since binary elements $x_0$ to $x_6$ are null.

The blocks 22, 24, 26 and 28 of FIG. 2 may then be replaced by a "digital integrator" such as illustrated in FIG. 9 by reference numeral 90. However, in the system chosen using ten binary digits to represent the amplitude of the signal and one digit to represent the sign, {now reduced to three binary digits ($x_9\,x_8\,x_7$) plus one for the sign ($x_{10}$)}, it becomes necessary to add circuits to distinguish the sign of the amplitude of the signal since the reversible counter 90 can only store the absolute value of the amplitude of the signal. In other words, a predetermined pulse to be applied to the reversible counter must be able to cause the level of the counter to raise or to fall depending on the sign of the signal already stored in it. Therefore, a circuit 91 is provided to detect the passage of the reversible counter through the value zero, this being an indication of a possible change of the sign of the level of the signal stored in the counter. To this effect, an AND gate 90 is connected to the $\bar{x}_i$ terminals of storage elements $x_9$, $x_8$ and $x_7$ and provides an output 1 when $x_9$, $x_8$ and $x_7$ are all equal to zero. Such output 1 is applied to a delay device 92 the output of which is applied to two AND gates $A_{91}$ and $A_{92}$. The polarity of the following digit appearing at the output of $\Delta M$ register 93 will determine which one of gates $A_{91}$ and $A_{92}$ will conduct to store a digit representative of the sign of the signal in the reversible counter in a memory device 94 which may be a simple flip-flop device. For example, if $x_{\Delta M}=1$ (positive signal), gate $A_{91}$ will conduct to store a digit 1 in storage element $x_{10}$ of memory device 94. If on the other hand $x_{\Delta M}=0$ (negative signal), a signal 1 will be applied from $\bar{x}_{\Delta M}$ to $A_{92}$ to store a digit 1 into $x_{10}$ of memory device 94.

Delay device 92 is used to prevent an early operation of memory device 94 by delaying the opening of gates $A_{91}$ and $A_{92}$ until after the digit $x_{\Delta M}$ which was brought the level of the reversible counter to 0 has disappeared from the input of gates $A_{91}$ and $A_{92}$.

A second circuit 95 is provided to determine if the absolute value of the level of the counter 90 should rise or fall depending on the sign of the binary digit to be stored in the register and on the sign of the signal already stored in it. Such a circuit comprises two AND gates $A_{93}$ and $A_{94}$ responsive to flip-flop device 94 and to the signal at the output of register 93. In addition, an OR gate $O_{90}$ is connected to the output of AND gates $A_{93}$ and $A_{94}$ and to the output of delay device 92.

In operation, if $x_{\Delta M}$ and $x_{10}$ are both equal to 1, $A_{93}$ provides a digital output 1 to the terminal + of the reversible counter to increase the level of the signal in the counter. If, on the other hand, $x_{\Delta M}=0$ and $x_{10}=1$, the output of gates $A_{93}$ and $A_{94}$ will be zero. Such value zero will be inverted by inverter 96 and a digital signal 1 will be applied to the negative terminal − of the counter to lower the level of the signal stored into it.

Let us assume now that the level of the signal in the counter 90 has decreased to a level below zero and that circuit 91 has caused a signal $x_{10}=0$ to be stored in memory 94. If a signal $x_{\Delta M}=0$ appears at the output of register 93, gate $A_{94}$ the inputs of which are responsive to $\bar{x}_{\Delta M}$ and $\bar{x}_{10}$ will provide a digital signal 1 to the terminal + of the reversible counter to increase the level of the signal stored into the counter. In other words, if a negative signal is already stored into the counter, the appearance of a negative pulse at the output of register 93 will cause the absolute value of the level of the signal in the reversible counter to rise. If, on the other hand, a signal $x_{\Delta M}=1$ appears at the output of register 93, gates $A_{93}$ and $A_{94}$ will not conduct and a digital signal 0 will appear at the output of OR gate $O_{90}$. Such digital signal will be inverted by inverter 96 to a digital signal 1 which is applied to the negative terminal of the reversible counter 90 to decrease the level of the signal already stored in the counter.

The first pulse applied to the reversible counter 90 following the passage of the level of the counter to zero must always be applied to terminal + thereof in order to store such pulse in the counter. For this reason, the output $s$ of delay device 92 is also applied to OR gate $O_{90}$. Indeed, a positive signal $x_{\Delta M}=1$ following a return of the counter to level zero with $x_{10}=0$ would cause a digital signal 1 to be applied to the terminal − of the counter which cannot be done. Similarly, a negative signal $x_{\Delta M}=0$ when the level of the counter is zero and $x_{10}=1$ would cause a decrease of the level of the counter which is impossible. Therefore, the digital output 1 appearing at the output of the device 92 is applied to the positive terminal of counter 90 to cause the counter to always raise its level by one digit upon reception of the following digit of register 93 after the passage of the counter by the value zero. The above operation of the "digital integrator" circuit may be summarized by the following logic function:

$$a=\bar{x}_{\Delta M}\cdot x_{10}+\bar{x}_{\Delta M}\cdot\bar{x}_{10}+s$$

The above disclosed circuits 91 and 95 of the "digital integrator" are needed because of the simplification of the compressor. If a number having four binary digits have been chosen to represent the amplitude of a signal varying between 0 and $+2A$ instead of using three binary digits for the amplitude plus a fourth digit for the sign, the compressor would have been much more complex but a reversible counter having four storage elements would have been sufficient without having to provide circuits 91 and 95. It is obvious that in both cases the principle of operation is the same.

The circuit of the compressor of FIG. 7 and the circuit of the integrator of FIG. 9 are assembled together in FIG. 10 to produce a complete $\Delta M$ to $PCM$ converter. However, the synchronization control originating from the clock is not shown.

In order to more clearly see how the two circuits are interconnected, the same reference characters have been used. In addition, the seven storage elements of shift register 93 have been shown together with a shift control connection originating from a clock in a known manner. It may also be seen that binary digit $y_0$ which is always equal to zero as well as binary digit $y_5$ which is always equal to 1 have been shown schematically as being permanent in output register 71. It is also to be understood that such a register is known in the art and may be composed, for example, of flip-flop devices.

It is to be noted that if the normal PCM code was composed of seven binary digits representing the amplitude of the signal ( 0 to 2A) instead of the usual six binary digits representing the amplitude ( 0 to A ) and a seventh digit representing the sign of such amplitude, a simple transformation of the output of the converter would be needed and could be done as follows:

If digit 1 is used for the positive amplitudes of the signal and digit 0 is used for the negative amplitudes of the signal, the members comprised between $A$ and $2A$ in one code could be written as the positive numbers of the others. However, to a number $x$ comprised between 0 and $A$ corresponds a negative number having the absolute value $Y = A - X$, that is in a six digit binary code $Y = 1\ 1\ 1\ 1\ 1\ 1 - X$. In other words, each digit of the number $Y$ is the complement of the corresponding digit of the number $X$. As far as the seventh digit is concerned, it is unchanged because the negative value of the signal is represented by digit 0. In conclusion, when the seventh digit is null, it is sufficient to take the complement of digits $x_5$ to $x_0$.

d — Description of *PCM* to $\Delta M$ converter d – 1 Comparator

Proceeding now with the description of the comparator of the *PCM* to $\Delta M$ converter, the input thereof consists of digits $x_9\, x_8\, x_7$ which represent the amplitude of the signal and of digit $x_{10}$ which represents the sign of such amplitude (1 for positive signals and 0 for negative signals). The above digits originate from the output of the expander illustrated in FIG. 8 and are stored in a conventional input register (illustrated schematically by reference numeral 32 in FIG. 3 of the drawings) which indicates the level of the signal at instant $T_i$. The level of the signal at instant $T_{i-1}$ is contained in the storage elements (identified by reference characters $e_{10}$ $e_9\, e_8\, e_7$ to distinguish them from the preceding ones) of a "digital integrator" which may be similar to the "-digital integrator" disclosed in FIG. 9.

In order to generate a $\Delta M$ output signal which corresponds to the original $\Delta M$ signal, it is necessary to compare the $PCM_i$ signal ($x_{10}\, x_9\, x_8\, x_7$) at time $T_i$ with the signal $PCM_{i-1}$ at time $T_{i-1}$ and to generate within one period $T$ a signal having seven binary digits which will bring the number $e_{10}\, e_9\, e_8\, e_7$ as close as possible to $x_{10}\, x_9\, x_8\, x_7$. Such a comparator will provide an output $Z = 1$ when $x > e$ and an output $Z = 0$ when $x < e$.

The comparator illustrated in FIG. 11 comprises a first circuit 110 which compares the absolute values of the two signals $x$ and $e$ and its output $S$ is equal to 1 when $x_9\, x_8\, x_7 > e_9\, e_8\, e_7$. Circuit 110 comprises an arrangement of AND gates $A_{110}$ to $A_{116}$, OR gates $O_{110}$ and $O_{111}$ and two inverters $I_{110}$ and $I_{111}$ capable of generating the following logic function:

$$S = x_9 \cdot \bar{e}_9 + \overline{\bar{x}_9 \cdot e_9}\,[x_8\, \bar{e}_8 + \overline{\bar{x}_8 \cdot e_8 \cdot}\, x_7 \cdot \bar{e}_7]$$

For example, if the signal $x_9\, x_8\, x_7$ is 1 1 1 and signal $e_9$ $e_8\, e_7$ is 1 1 0, the circuit will operate as follows:

a. the output of AND gate $A_{114}$ will be zero;

b. the output of AND gate $A_{113}$ will be equal to zero but inverter $I_{111}$ will apply a digital signal 1 to the first input of AND gate $A_{116}$;

c. the output of AND gate $A_{112}$ will be equal to zero;

d. the output of AND gate $A_{111}$ will be equal to zero but such signal will be inverted by inverter $I_{110}$ to apply a digit 1 to the first input of AND gate $A_{115}$;

e. the output of AND gate $A_{110}$ will be equal to 1 to open AND gate $A_{115}$ and transmit a digital signal 1 through OR gate $O_{110}$ to AND gate 116 which is also open and thus will transmit a signal 1 through OR gate $O_{111}$ to output S of circuit 110. S will consequently be equal to 1 indicating that $x = e$ as assumed at the beginning (111 > 110).

A second circuit 111 determines the value Z in function of S, $x_{10}$ and $e_{10}$, wherein $x_{10}$ and $e_{10}$ represent the sign of the signals $x$ and $e$. The following table determines the value Z:

Table 6

| $x_{10}$ | $e_{10}$ | S | Z |
|---|---|---|---|
| 1 | 0 | 0 | 1 |
| 0 | 0 | 0 | 1 |
| 1 | 1 | 0 | 0 |
| 0 | 1 | 0 | 0 |
| 1 | 0 | 1 | 1 |
| 0 | 0 | 1 | 0 |
| 1 | 1 | 1 | 1 |
| 0 | 1 | 1 | 0 |

The above Table 6 is satisfied by the following logic function:

$$Z = Sx_{10} + \bar{S}\,\bar{e}_{10}$$

The above function is realized by an arrangement comprising AND gates $A_{117}$ and $A_{118}$, OR gate $O_{112}$ and inverter $I_{112}$. For example, if $x_{10} = 1$, $e_{10} = 0$ and $S = 0$, inverter $I_{112}$ will transform the signal $S = 0$ into a digital signal 1 applied to the first input of AND gate $A_{118}$. Signal $\bar{e}_{10}$ being equal to 1, a digital signal 1 will be applied to OR gate $O_{112}$ and Z will be equal to 1. The other combinations of S, $x_{10}$ and $e_{10}$ may be easily verified and are not disclosed in detail.

d – 2 converter

FIG. 12 illustrates a complete *PCM* to $\Delta M$ converter grouping an expander 120, an integrator 121 and a comparator 122 illustrated in a block diagram form and corresponding to the expander, "digital integrator" and comparator of FIGS. 8, 9 and 11 respectively. The value of the signal Z is applied to a shift register 123 capable of storing seven binary digits representing the $\Delta M$ output signal, and to the reversible counter of the "digital integrator" disclosed in FIG. 9 of the drawings. It is necessary to memorize the value Z during the above-mentioned operation. For this purpose, such value Z is applied to a memory device 124 which may be a flip-flop. The two reversible portions of the flip-flop 122 are applied to AND gates $A_{120}$ and $A_{121}$ which are connected to the inputs of AND gates $A_{93}$ and $A_{94}$ of integrator 121 under the control of a clock. In operation, if $Z = 1$, a signal 1 will appear at the output of gate $A_{120}$. If $Z = 0$ such signal will be inverted by inverter $I_{120}$ and applied to AND gate $A_{121}$ through memory device 124.

2 — double integration a — characteristics

The $\Delta M$ to *PCM* converter disclosed in the first embodiment of the invention was for use with a $\Delta M$ modulator using an integrator 16 (FIG. 1) performing a simple integration, that is an integrator whose output is a series of quantization steps having equal values and the polarity of which is positive or negative depending on the polarity of the modulator as illustrated in FIG. 13*a* of the drawings. If integrator 16 is of the type performing a double integration wherein the output of the integrator is a series of straight line segments the slope of which is modified by the modulator as illustrated in FIG. 13*b*, the $\Delta M$ to *PCM* converter will have to be designed accordingly.

By definition, the quantization step $\sigma$ in the case of double integration is the variation of the voltage obtained at the output of a double integrator during a $\Delta M$ sampling period when a pulse is applied thereto from the modulator when the output of such integrator is initially zero. For example, if the double integrator receives a series of pulses of the same polarity, the increase of voltage at the end of each $\Delta M$ sampling period will be successively $\sigma, 2\sigma, 3\sigma, 4\sigma, \ldots$.

Similarly to the simple integration, it is necessary to define the value of the ratio $A/\sigma$ which permits to follow a predetermined analog signal. It has been found in practice that a ratio $A/\sigma = 36$ is sufficient, when the integrator is fully discharged (worst condition), to reach in less than ⅛ of a period an analog signal having a slope $2\pi fA$ when $f = 1{,}000$ Hz at a sampling rate of 56 KHz. This does not take into effect the quantization noise but ensures that the telecommunication signals will be followed without overloading.

As for the simple integration, it is desirable that the value $A/\sigma$ be a power of 2 in order to simplify the equipment and such value has been chosen as being 32 or $2^5$ which means that $K = \sigma PCM/\sigma\Delta M = 2^5$ b — description of the $\Delta M$ to *PCM* converter b–1 — digital compressor The digital compressor used for the $\Delta M$ to *PCM* converter with double integration is similar to the one used with simple integration illustrated in FIG. 5 except that with $K = 2^5$, $x_0$ to $x_4$ only are equal to zero. Consequently, groups I, II and III only are eliminated and the transfer to be performed for transforming a ten binary digit number into a six binary digit number are as illustrated in the following table.

Table 7

| Binary element number | Group Number IV | V | VI | VII | VIII |
|---|---|---|---|---|---|
| 1 | | | | $x_5$ | $x_6$ |
| 2 | | | | $x_6$ | $x_7$ |
| 3 | | $x_5$ | $x_5$ | $x_7$ | $x_8$ |
| 4 | | $x_6 = 1$ | $x_6$ | | 1 |
| 5 | 1 | 1 | | 1 | 1 |
| 6 | | | 1 | 1 | 1 |

The transformation illustrated in Table 7 may be performed by the circuit illustrated in FIG. 14 and comprising an input register 140, AND gates $A_{140}$ to $A_{152}$, OR gates $O_{140}$ to $O_{142}$ and storage elements $y_0$ to $y_5$ forming part of an output register 141.

Taking a number $x$ in group IV the identification digits $x_9\, x_8\, x_7\, x_6\, x_5$ of which being 0 0 0 0 1, inputs $\bar{x}_9$, $\bar{x}_8$, $\bar{x}_7$ are applied to AND gate $A_{140}$ to render such gate conductive and thus apply a digital signal 1 to AND gate $A_{141}$. Inputs $\bar{x}_6$, $x_5$ (1, 1) are applied to the other two terminals of gate $A_{141}$ to render such gate conductive and store a digit 1 in memory element $y_4$ of the output register through OR gate $O_{140}$.

A number in group V will have the identification digits 0 0 0 1. Consequently, inputs $\bar{x}_9$, $\bar{x}_8$, $\bar{x}_7$ will be equal to 1 and render AND gate $A_{140}$ conductive to apply a digit 1 on the first input of AND gate $A_{142}$. Input $x_6$ being equal to 1, gate $A_{142}$ will conduct to apply a signal 1 to the first input of AND gates $A_{143}$ and $A_{144}$ through OR gate $O_{141}$ and to store a digit 1 in $y_4$ through OR gate $O_{140}$. Input $x_6 = 1$ is applied to the other input of gate $A_{143}$ to store digit 1 in slot $y_3$ of the output register through OR gate $O_{142}$. In addition, input $x_5$ is applied to the other input of gate $A_{144}$ to transfer $x_5$ into $y_2$ through OR gate $O_{143}$.

A number in group VI will have the identification digits 0 0 1. Consequently, $\bar{x}_9$, $\bar{x}_8$, $x_7$ applied to AND gate $A_{145}$ will render such gate conductive to apply a digit 1 to the first input of gated $A_{143}$ and $A_{144}$ through OR gate $O_{141}$ and to store a digit 1 in memory element $y_3$ through OR gate $O_{142}$. Inputs $x_5$ and $x_6$ applied to the second inputs of $A_{143}$ and $A_{144}$ will transfer $x_5$ and $x_6$ into storage elements $y_2$ and $y_3$ through OR gates $O_{143}$ and $O_{142}$ respectively.

A number in group VII will have the identification digits 0 1. Digits $\bar{x}_9$, $\bar{x}_8$ being applied to AND gate $A_{146}$ will render such gate conductive and apply a digit 1 on the first input of AND gates $A_{147}$, $A_{148}$ and $A_{149}$ to cause the transfer of digits $x_5$, $x_6$ into storage elements $y_0$ and $y_1$ through OR gates $O_{144}$ and $O_{145}$ respectively and digit $x_7$ into storage element $y_2$ through OR gate $O_{143}$. The conduction of gate $A_{146}$ also causes a digit 1 to be stored in storage elements $y_4$ and $y_5$ through OR gates $O_{140}$ and $O_{146}$ respectively.

A number in group VIII will have the identification digit 1. Digit $x_9$ being equal to 1 will be applied to the first input of AND gates $A_{150}$, $A_{151}$ and $A_{152}$ to cause the transfer of digits $x_6$, $x_7$ into storage elements $y_0$, $y_1$ through OR gates $O_{145}$ and $O_{146}$ respectively and digit $x_8$ into storage $y_2$ through OR gate $O_{143}$. In addition, it would store digit 1 in storage elements $y_3$, $y_4$ and $y_5$ through OR gate $O_{143}$, $O_{140}$ and $O_{146}$ respectively.

b–2 — $\Delta M$ to *PCM* converter

Generally speaking, the $\Delta M$ to *PCM* converter with double integration is a digital integrator which comprises two stages of integration, each stage being similar to the single stage integrator used in simple integration, interconnected by a linking stage. Such a converter is illustrated in FIG. 15.

The integrator comprises a first stage 150 to which is applied the output of a shift register 151 under the control of a clock. As mentioned previously, shift register 151 is connected to the $\Delta M$ link. It has been determined that with a ratio $A/\sigma = 32$ and a frequency of the analog signal of 1,000 Hz, at the most eight consecutive pulses of the same polarity will appear at the input of the integrator. Therefore, the reversible counter of the first stage of integration requires only three binary storage elements plus one for the sign to permit a count from −8 to +8. Consequently, the first stage of integration is identical to the single stage integrator used in FIG. 9.

If after reading a digit of the signal $\Delta M$, the level of the first stage of integration is $+n$, $n$ pulses of level 1 must be forwarded towards the second stage of integration. If the level is $-m$, $m$ pulses of level 0 must be sent.

For this purpose, an auxiliary counter 152 having a capacity for storing three binary digits is provided and the output of such auxiliary counter is applied to a comparator 153. As long as the output of the comparator 153 is zero indicating that the number stored in the first stage 150 is higher than that stored in the auxiliary counter 152, inverter $I_{160}$ connected to the output of comparator 153 will maintain AND gate $A_{160}$ conductive and a pulse generator 154 will apply a series of pulses to the auxiliary counter 152 until the number stored in the auxiliary counter 152 is equal to the number stored in the first stage 150 of the integrator. The output of comparator 153 will then become equal to 1 and gate $A_{160}$ will be closed.

Comparator 153 comprises a series of AND gates $A_{161}$ to $A_{166}$ to which is applied respectively each one of the numbers $(x_7,1)$, $(x_8,2)$, $(x_9,3)$ and each of their complements. The outputs of gates $A_{161}$ and $A_{162}$ are applied to the first input of AND gate $A_{167}$ through OR gate $O_{160}$. The outputs of gates $A_{163}$ and $A_{164}$ are applied to the second input of gate $A_{167}$ through OR gate $O_{161}$. Similarly, the outputs of AND gates $A_{165}$ and $A_{166}$ are applied to the third input of gate $A_{167}$ through OR gate $O_{162}$. When the three inputs of gate $A_{167}$ are equal to 1, gate $A_{167}$ conducts to close gate $A_{160}$, as mentioned previously. Depending on the sign of the signal stored in the first stage of integration and indicated by $x_{10}$, AND gate $A_{168}$ or $A_{169}$ will conduct and transmit the pulses of the pulse generator 154 to the positive or negative terminals of the second stage of integration.

The second stage of integration is identical to the first stage except that it is capable of storing five binary elements plus the sign. Since it is otherwise identical to the single stage of integration of FIG. 9, the same reference characters have been used and reference is made to FIG. 9 for the description and operation of the second stage of integration. Finally, it is to be noted that the synchronization signals are not shown.

c — description of *PCM* to $\Delta M$ converter

The *PCM* to $\Delta M$ converter illustrated in FIG. 16 comprises a digital expander 180 connected to a comparator 181 which compares the signal originating from the digital expander with that stored in double integrator 182 which is identical to the one disclosed in FIG. 15. The output of comparator 181 is applied to shift register 183 through a memory circuit including flip-flop device 184, AND gates $A_{180}$ and $A_{181}$ and inverter $I_{190}$ identical to the one disclosed in the *PCM* to $\Delta M$ converter with simple integration. The content of the shift register 183 is applied to the $\Delta M$ link under the control of a clock in a known manner.

c –1— digital expander

The expander used in the PCM to $\Delta M$ converter with double integration is illustrated in FIG. 17 and comprises input register 190, AND gates $A_{185}$ to $A_{197}$, OR gate $O_{190}$ and output register 191. Since $K = 2^5$, groups I, II and III are eliminated and the transformation to be performed is illustrated in the following table:

Table 8

| Binary element number | Group Number IV | V | VI | VII | VIII |
|---|---|---|---|---|---|
| 6 | 1 | $y_2$ | $y_2$ | $y_0$ | |
| 7 | | $y_3 = 1$ | $y_3$ | $y_1$ | $y_0$ |
| 8 | | | 1 | $y_2$ | $y_1$ |
| 9 | | | | 1 | $y_2$ |
| 10 | | | | | 1 |

The transformation illustrated in Table 8 may be performed as follows:

Taking a number in group IV having the form 0 1 0 $y_2$ $y_1$ $y_0$, digits $\bar{y}_5$ $y_4$ $\bar{y}_3$ are applied to AND gate $A_{185}$ to render such gate conductive and store a digit 1 in storage element $x_5$ of the output register through OR gate $O_{189}$.

A number in group V has the form 0 1 1 $y_2$ $y_1$ $y_0$. Digits $\bar{y}_5$ $y_4$ $y_3$ applied to AND gate $A_{186}$ cause a digit 1 to be applied to the first input of AND gates $A_{187}$ and $A_{188}$ through OR gate $O_{190}$, thus causing the transfer of digits $y_2$ and $y_3$ into storage elements $x_5$ and $x_6$ through OR gates $O_{189}$ and $O_{191}$.

A number in group VI has the form 1 0 $y_3$ $y_2$ $y_1$ $y_0$. Digits $y_5$ $\bar{y}_4$ render AND gate $A_{189}$ conductive to again apply a digit 1 to the first input of AND gates $A_{187}$ and $A_{188}$ thus transferring digits $y_2$ and $y_3$ into storage elements $x_5$ and $O_6$ through OR gates $O_{189}$ and $O_{191}$. In addition, the conduction of gate $A_{189}$ also stores a digit 1 in storage element $x_7$ through OR gate $O_{192}$.

A number in group VII has the form 1 1 0 $y_2$ $y_1$ $y_0$. Digits $y_5$ $y_4$ $\bar{y}_3$ render AND gate $A_{196}$ conductive to apply a digit 1 to AND gates $A_{191}$, $A_{192}$ and $A_{193}$ thus transferring digits $y_0$, $y_1$ and $y_2$ into storage elements $x_5$, $x_6$ and $x_7$ through OR gates $O_{189}$, $O_{191}$ and $O_{192}$ respectively. In addition, it stores a digit 1 in storage element $x_8$ through OR gate $O_{193}$.

A number in group VIII has the form 1 1 1 $y_2$ $y_1$ $y_0$. Therefore, digits $y_5$ $y_4$ $y_3$ applied to AND gate $A_{194}$ cause a digit 1 to be applied to AND gates $A_{195}$, $A_{196}$ and $A_{197}$ to transfer $y_0$, $y_1$ and $y_2$ into storage elements $x_6$, $x_7$ and $x_8$ respectively through OR gates $O_{191}$, $O_{192}$ and $O_{193}$. In addition, the conduction of gate $A_{194}$ stores a digit 1 in storage element $x_9$.

c – 2 comparator

The comparator of the *PCM* to $\Delta M$ converter is illustrated in FIG. 18. As mentioned previously, it must compare the value of the binary element $x$ appearing at the output of the expander 180 with the value of the binary element $e$ stored in the double integrator 182 at time $T_{i-1}$ to find out whether $x$ is larger or smaller than $e$ so as to generate a positive or negative pulse corresponding to the $\Delta M$ modulation signal to be applied to shift register 183. The output $Z$ of the comparator will be 1 when $x > e$ and zero when $x < e$.

Similarly to the comparator used in the simple integration, a first circuit is provided to compare the absolute value of the two signals $x$ and $e$. Its output $S$ is equal to 1 when $x_9\,x_8\,x_7\,x_6\,x_5 > e_9\,e_8\,e_7\,e_6\,e_5$. Such a circuit comprises an arrangement of AND gates $A_{200}$ to $A_{212}$, of OR gates $O_{200}$ to $O_{203}$ and of inverters $I_{200}$ to $I_{203}$ interconnected in the same fashion as in FIG. 11 to obtain the following logic function:

$$S = X_9 \cdot \bar{e}_9 + \overline{\bar{x}_9 \cdot e_9} \cdot \{x_8 \cdot \bar{e}_8 + \overline{\bar{x}_8 \cdot e_8} \cdot [x_7 \cdot \bar{e}_7 + \overline{\bar{x}_7 \cdot e_7}(x_6 \cdot \bar{e}_6 + \overline{\bar{x}_6 \cdot e_6} \cdot x_5\} \cdot \bar{e}_5)]a$$

Taking for example a number $x$, the significant digits $x_9$ to $x_5$ of which are 1 1 1 1 1 and a number $e$ the significant digits $e_9$ to $e_5$ of which are 1 1 1 1 0, the above circuit will operate as follows:

a. AND gate $A_{200}$ will remain closed;

b. AND gate $A_{201}$ will also remain closed but inverter $I_{200}$ will invert this signal to a digit 1 to be applied to the first input of AND gate $A_{212}$;

c. AND gate $A_{202}$ will remain closed;

d. AND gate $A_{203}$ will also remain closed but inverter $I_{201}$ will apply a digit 1 to the first input of AND gate $A_{211}$;

e. AND gate $A_{204}$ will remain closed;

f. AND gate $A_{205}$ will also remain closed but inverter $I_{202}$ will invert the output of gate $A_{205}$ into a digit 1 to be applied to the first input of AND gate $A_{210}$;

g. AND gate $A_{206}$ will remain closed;

h. AND gate $A_{207}$ will also remain closed but inverter $I_{203}$ will invert the output of gate $A_{207}$ to a digit 1 applied to the first input of AND gate $A_{209}$;

i. AND gate $A_{208}$ will conduct thus applying digit 1 to the second input of gate $A_{209}$ to render such gate conductive. The digit 1 at the output of gate $A_{209}$ will be transmitted to AND gates $A_{210}$, $A_{211}$ and $A_{212}$ through OR gates $O_{200}$, $O_{201}$, $O_{202}$ and $O_{203}$. This will provide a signal $S = 1$ indicating that, in fact, $S > e$ as it was assumed at the beginning.

A second circuit determines the value $Z$ in function of $S$, $x_{10}$ and $\bar{e}_{10}$. Such circuit comprises AND gates $A_{213}$ and $A_{214}$, OR gate $O_{204}$ and inverter $I_{204}$ which are connected in the same way as the circuit 111 of FIG. 11. Therefore, it appears to be unnecessary to disclose such circuit in detail and reference is made to FIG. 11 for the operation of the circuit.

3 — operating time a — time necessary for one conversion

The time necessary for one conversion depends on the speed of operation of the logic elements used. To find out such time, it will be necessary to determine the sum of the logic levels to go through and of the multivibrator devices used as storage elements. In the $\Delta M$ to *PCM* conversion using the simple integration, it may be found that the number of logic levels to go through is 51 and the number of multivibrator elements used is 22. Using MECL II logic elements sold by Motorola Semiconductor Products Incorporated, wherein the propagation time of each logic level is 4 ns and the operation time of each multivibrator is 6 ns, the time taken for one $\Delta M$ to *PCM* conversion would be approximately 350 ns.

In the *PCM* to $\Delta M$ conversion, there are 114 logic levels to go through and 22 multivibrators to operate. Using the same logic elements as above, the propagation time would be approximately 600 ns.

The $\Delta M$ to *PCM* conversion with double integration requires 494 logic levels and 113 multivibrators. With the above logic elements, the propagation time would be 2.8 micro seconds.

For the *PCM* to $\Delta M$ conversion there are 584 logic levels and 120 multivibrators. Consequently, the propagation time is 3.1 micro seconds.

In the PCM system used in North America having 24 channels, the time allocated for each channel is 125/24 = 5.2 micro seconds. In the system used in Europe having 32 channels, the time allocated for each channel is 125/32 = 3.9 micro seconds. In view of the above, it may be seen that one common circuit may be used for successively converting the different channels.

The principle of the above disclosed converter may also be applied to other types of $\Delta M$ modulation such as for example the continuous $\Delta M$ modulation. It would only be necessary to replace the first stage of integration used in the double integration by another logic circuit which would be appropriate to the continuous $\Delta M$ modulation. However, the number of pulses to be totalized in the second stage of integration would be much larger. The operating time would then be greatly increased and could exceed the limits of 3.9 or 5.2 micro seconds.

In such a case, other logic circuits which are faster could be used as for example the MECL III logic elements also sold by Motorola Semiconductor Products Incorporated having a propagation time of 1.0 ns. Alternatively, the second stage of integration could be modified. Assuming that it is required to integrate seven positive pulses that is to add binary number 1 1 1 to the binary number in the counter. It is possible to effectuate a rapid operation in modifying the reversible counter of the second stage of integration by placing an input on each binary element of the counter, the input $x_i$ modifying the elements $x_i$ to $x_9$ but leaving unchanged the elements $x_{i-1}$ to $x_5$. In other words, the counting is done starting from the element of order $i$.

For example, to integrate the number 7 it would be necessary to send a pulse to the input $x_5$, then to the input $x_6$ and finally to the input $x_7$. Consequently, three pulses only are counted instead of seven. The detail of such circuits are not disclosed but the increase of operating speed would result in a more complex reversible counter.

b — common circuits

FIG. 19 illustrates a converter used in an arrangement of 24 channels. No matter the type of $\Delta M$ modulation used, the input signal originating from the $\Delta M$ link is fed to a decoder 210 of the type commonly known in the art. The decoder 210 stores the binary digits received in the proper registers $\Delta M_0$ to $\Delta M_{23}$ in the order 0, 1, 2, . . . 23 . . . .

The binary digits of a predetermined channel $i$ are regularly spaced in a sampling period $T$. Consequently, it is required to have a $\Delta M$ register for each channel.

Each channel must also have a predetermined interval of time during which he has access to the converter in accordance with the invention which is identified by reference 212. This interval of time is 125/24 micro seconds and must be such that the $\Delta M$ register which is being connected to the converter does not receive any $\Delta M$ digit during that time.

FIG. 20 illustrates the order in which the $\Delta M$ digits $x_{\Delta M}$ are stand in registers $\Delta M_0$ to $\Delta M_{23}$. One $\Delta M$ digit arrives every 125/158 = 0.744 micro seconds. This time interval is taken as one time unit $T_e$ in FIG. 20. At instant 0 arrives a digit from channel 0, at instant 1 a digit from channel 1 etc. . . . and between instants $i$ and $i+1$ there is a time interval of $T_e$.

FIG. 20 also illustrates a suitable sequence for the conversion of channels 0 to 23 so that a register $\Delta M_i$ does not receive a digit while it is connected to the converter. The sequence is 22, 1, 2, 12, 3, 4, 13, 14, 5, 6, 15, 16, 7, 8, 17, 18, 20, 21, 19, 10, 9, 23, 0 and 11. However, other sequences could be used.

Since all the information in one channel may be transmitted in 5.2 micro seconds, a single ΔM output register 213 is necessary at the output of the converter 212.

Although the above converter has been disclosed for use with a PCM system having 24 channels and a seven digit code, it is to be understood that it could be modified for use with systems having a different number of channels and a different code.

We claim:

1. A system for the conversion of a delta modulation signal generated by a delta modulator into a pulse code modulation signal comprising:

a. register means for storing an input signal consisting of a number $n$ of binary digits generated by said delta modulator during a time period corresponding to a normal pulse code modulation sampling period $T_i$, said number $n$ being greater than zero and each binary digit representing a positive or negative delta modulation quantization step of a quantized signal;

b. means for effecting the algebraic sum of said positive and negative quantization steps to obtain the increase or decrease of the quantized signal during said sampling period;

c. means for multiplying said algebraic sum by a constant positive integer $K$ representing the ration of the value of a delta modulation quantization step over the value of a pulse code modulation quantization step to obtain a binary signal representing said increase or decrease of the quantized signal in pulse code modulation quantization steps;

d. means for adding the binary signal obtained by said multiplication to the binary signal obtained during the preceding sampling period $T_{i-1}$ to obtain a $m$ bit binary output signal corresponding to the regular pulse code modulation signal; and e. a digital compressor for receiving said output signal for transforming said output signal to a $q$ bit pulse code modulation signal, where $q$ is less than $m$.

2. A system as defined in claim 1, wherein elements b), c) and d) are combined in "a digital integrator" including a reversible binary counter capable of storing said binary output signal, said reversible counter being fed with an input signal corresponding to $K$ positive or $K$ negative pulses representing the increase or decrease of the quantized signal in pulse code modulation quantization steps.

3. A system as defined in claim 2, wherein the maximum number of $\Delta M$ quantization steps of the quantized input signal is $2^3$ and may be represented by a three binary digit number plus a fourth digit for the sign, and wherein $K$ is equal to $2^7$, whereby said binary output signal is a number comprising ten binary digits representing the amplitude of the quantized signal and an 11th digit representing the sign of the quantized signal and in which the seven less significant digits are null, and wherein said reversible binary counter comprises three binary storage elements capable of storing the absolute value of the three most significant digits of said output signal and an additional storage element for storing the sign thereof.

4. A system as defined in claim 3, wherein said "digital integrator" comprises a first gate circuit responsive to the sign of said input signal and to the output signal stored in said reversible counter for detecting a change of sign of the output signal stored in the binary reversible counter and for storing said change of sign in said additional storage element, and a second gate circuit responsive to both said additional storage element and to the sign of the input signal to be stored in said reversible counter for causing the level of said reversible counter to rise or fall accordingly.

5. A system as defined in claim 3, further comprising circuit means for transforming the number having three significant binary digits stored in the storage elements of said reversible counter and representing the amplitude of the output signal, and the additional binary digit stored in said additional storage element of said reversible counter and representing the sign of the amplitude of said output signal into a number having six binary digits representing the amplitude of the output signal and a seventh binary digit representing the sign of the amplitude of the output signal to produce a seven binary digit number corresponding to the normal pulse code modulation code number.

6. A system as defined in claim 5, wherein said transforming means comprises an output register having storage elements for storing said six binary digit number representing the amplitude of the output signal, a first gate circuit responsive to predetermined combinations of binary digits in the storage elements of said reversible counter for identifying the group to which said binary digit number belongs and for storing the digits identifying said group into predetermined storage elements of said output register, a second gate circuit interconnecting predetermined storage elements in said binary reversible counter to predetermined storage elements of said output register and responsive to said first gate circuit for transferring the binary digits relating to the level of said binary digit number into the predetermined storage elements of said output register.

7. A system as defined in claim 1, for use with a delta modulator of the double integration type wherein the maximum number of consecutive positive or negative pulses of said input signal is eight, wherein the maximum number of $\Delta M$ quantization steps is $2^5$, and wherein $K$ equals $2^5$ thus rendering the five less significant digits of the binary output signal null, said elements b), c) and d) being combined in a "digital integrator" comprising a first stage of integration including a first reversible counter capable of storing said maximum number of consecutive positive or negative pulses and a second stage of integration including a second reversible counter capable of storing the five most significant binary digits of the output signal, and a linking circuit for transferring the binary digits stored into the first integration stage into the second integration stage.

8. A system as defined in claim 7, wherein said linking circuit comprises an auxiliary counter, a comparator to which is applied the output of said first integration stage and the output of said auxiliary counter, and a pulse generator responsive to the output of said comparator for storing the required binary digits into said second integration stage.

9. A system as defined in claim 7, further comprising circuit means for transforming said number having five significant binary digits stored into the five storage elements of said second reversible counter and representing the amplitude of the output signal and an additional binary digit representing the sign of the amplitude into a number having six binary digit representing the amplitude of the output signal and a seventh binary digit representing the sign of the amplitude to produce a seven binary digit number corresponding to the normal pulse code modulation code.

10. A system as defined in claim 9, wherein said transforming means comprises an output register having six storage elements for storing the amplitude of the signal, a first gate circuit responsive to predetermined combinations of binary digits in the storage elements of said second binary counter for identifying the group to which said five binary digits belong and for storing the digits identifying said group into predetermined storage elements of said output register, a second gate circuit interconnecting predetermined storage elements in said second reversible counter to said output register and responsive to said first gate circuit for transferring the binary digits relating to the level of said five binary digit number into the predetermined storage elements of said output register.

* * * * *